US010693869B2

(12) United States Patent
York et al.

(10) Patent No.: US 10,693,869 B2
(45) Date of Patent: Jun. 23, 2020

(54) SYSTEMS, METHODS, AND APPARATUSES FOR IMPLEMENTING A WEB-BASED LIFE MANAGEMENT PLATFORM WITH USER CREATED ELECTRONIC COMMUNICATIONS TRIGGERED UPON FUTURE EVENTS

(71) Applicant: 541 Software, LLC, Bend, OR (US)

(72) Inventors: Kenneth York, Bend, OR (US); Scott Mary, Bend, OR (US); James Aschoff, Bend, OR (US)

(73) Assignee: 541 Software, Inc., Bend, OR (US)

( * ) Notice: Subject to any disclaimer, the term of this patent is extended or adjusted under 35 U.S.C. 154(b) by 196 days.

(21) Appl. No.: 15/963,859

(22) Filed: Apr. 26, 2018

(65) Prior Publication Data

US 2018/0316659 A1    Nov. 1, 2018

Related U.S. Application Data

(60) Provisional application No. 62/490,452, filed on Apr. 26, 2017.

(51) Int. Cl.
*H04L 29/06* (2006.01)
*H04L 29/08* (2006.01)
(Continued)

(52) U.S. Cl.
CPC .......... *H04L 63/083* (2013.01); *G06Q 10/10* (2013.01); *G06Q 40/08* (2013.01); *G06Q 50/18* (2013.01);
(Continued)

(58) Field of Classification Search
CPC ... H04L 63/10; H04L 63/083; H04L 63/0861; H04L 63/102; H04W 12/0608; G06Q 10/10; G06Q 40/08; G06Q 50/18
See application file for complete search history.

(56) References Cited

U.S. PATENT DOCUMENTS 6,633,878 B1 * 10/2003 Underwood ........... G06Q 10/10
7,610,339 B2 * 10/2009 Evans ................... H04L 63/083
709/206
(Continued)

*Primary Examiner* — Hosuk Song
(74) *Attorney, Agent, or Firm* — Elliot, Ostrander & Preston, P.C.

(57) ABSTRACT

In accordance with embodiments disclosed herein, there are provided methods and systems for implementing a web-based life management platform with user created electronic communications triggered upon future events supported by a processor and a memory to execute such functionality. For instance, there is disclosed in accordance with one embodiment, a life management platform including means for: generating a user account for a subscriber at the system; communicably interfacing with a user device over a network via a receive interface of the system, in which the user device operates remotely from the system; authenticating the subscriber via subscriber credentials received from the user device; receiving input from the user device defining each of: (i) one or more contacts, (ii) one or more messages, and (iii) one or more documents; receiving a request to configure a plan for the subscriber and configuring the plan to include (i) at least one of the one or more contacts, (ii) at least one of the one or more messages for the included contacts, and (iii) at least one of the one or more documents to be made accessible to the included contacts; defining an event trigger for the plan, in which the event trigger is to initiate execution of the plan upon occurrence of a subscriber defined event; and triggering execution of the plan at the system pursuant to determination the event trigger has occurred, in which execution of the plan includes transmitting a notice to the included contacts for the plan with a link to access the message and the one or more documents. Other related embodiments are disclosed.

20 Claims, 12 Drawing Sheets

(51) Int. Cl.
*H04W 12/00* (2009.01)
*H04W 12/06* (2009.01)
*H04L 12/58* (2006.01)
*G06Q 50/18* (2012.01)
*G06Q 40/08* (2012.01)
*G06Q 10/10* (2012.01)

(52) U.S. Cl.
CPC .............. *H04L 51/14* (2013.01); *H04L 51/18* (2013.01); *H04L 63/102* (2013.01); *H04L 67/306* (2013.01); *H04W 12/009* (2019.01); *H04W 12/0608* (2019.01); *H04L 51/32* (2013.01); *H04L 2463/082* (2013.01)

(56) References Cited

U.S. PATENT DOCUMENTS

| | | | | |
|---|---|---|---|---|
| 7,957,999 | B2 * | 6/2011 | Stoxen | G06Q 10/06311 705/7.15 |
| 8,787,581 | B2 * | 7/2014 | Maller | H04L 63/0435 380/285 |
| 9,281,945 | B2 * | 3/2016 | Voice | H04L 63/0245 |
| 2013/0191904 | A1 * | 7/2013 | Piliouras | H04L 67/02 726/7 |

* cited by examiner

FIG. 3A

ACCIDENT PLAN ACTIVATED

Below are instructions and documents related to the accident {subscriber name} has been in.

Landing Page 305

A MESSAGE FROM {SUBSCRIBER NAME}

Lorem ipsum dolor sit amet, consectetur adipiscing elit. Suspendisse commodo sagittis enim sed elementum. Sed nec leo ultrices, tempor dolor eu, commodo orci. Quisque eu dui a nunc sollicitudin placerat sed id enim. Vestibulum gravida dignissim augue, a vehicula enim venenatis vel. Nam eu mi justo. Integer sagittis arcu sit amet eros suscipit accumsan. Mauris ultrices nisl at orci venenatis, id tincidunt ipsum pharetra. Proin quis rhoncus sapien. Proin sit amet ornare dolor, eu volutpat turpis. Class aptent taciti sociosqu ad litora torquent per conubia nostra, per inceptos himenaeos. Morbi facilisis hendrerit convallis. Phasellus accumsan nec sem eu luctus. Etiam gravida semper rhoncus.

Aliquam posuere quam vitae nunc nunc iaculis, sed venenatis arcu interdum. Donec pellentesque erat vulputate vehicula posuere. Etiam vel tincidunt eros. Fusce ultrices venenatis ante. Praesent vitae tellus nunc. Proin vulputate fermentum diam, eget maximus justo auctor eget. Proin consequat enim et orci posuere tempus.

Message Contents 310

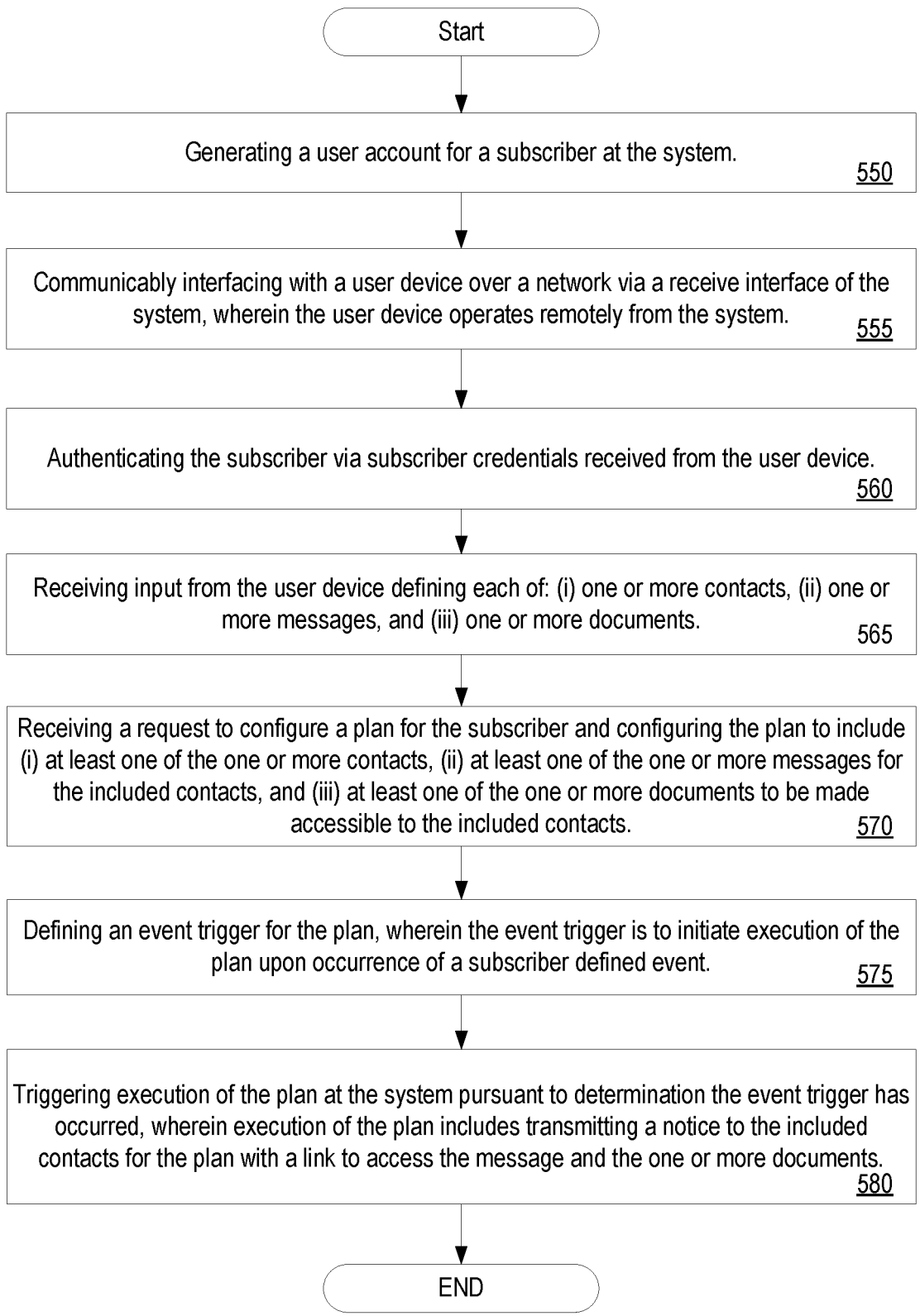

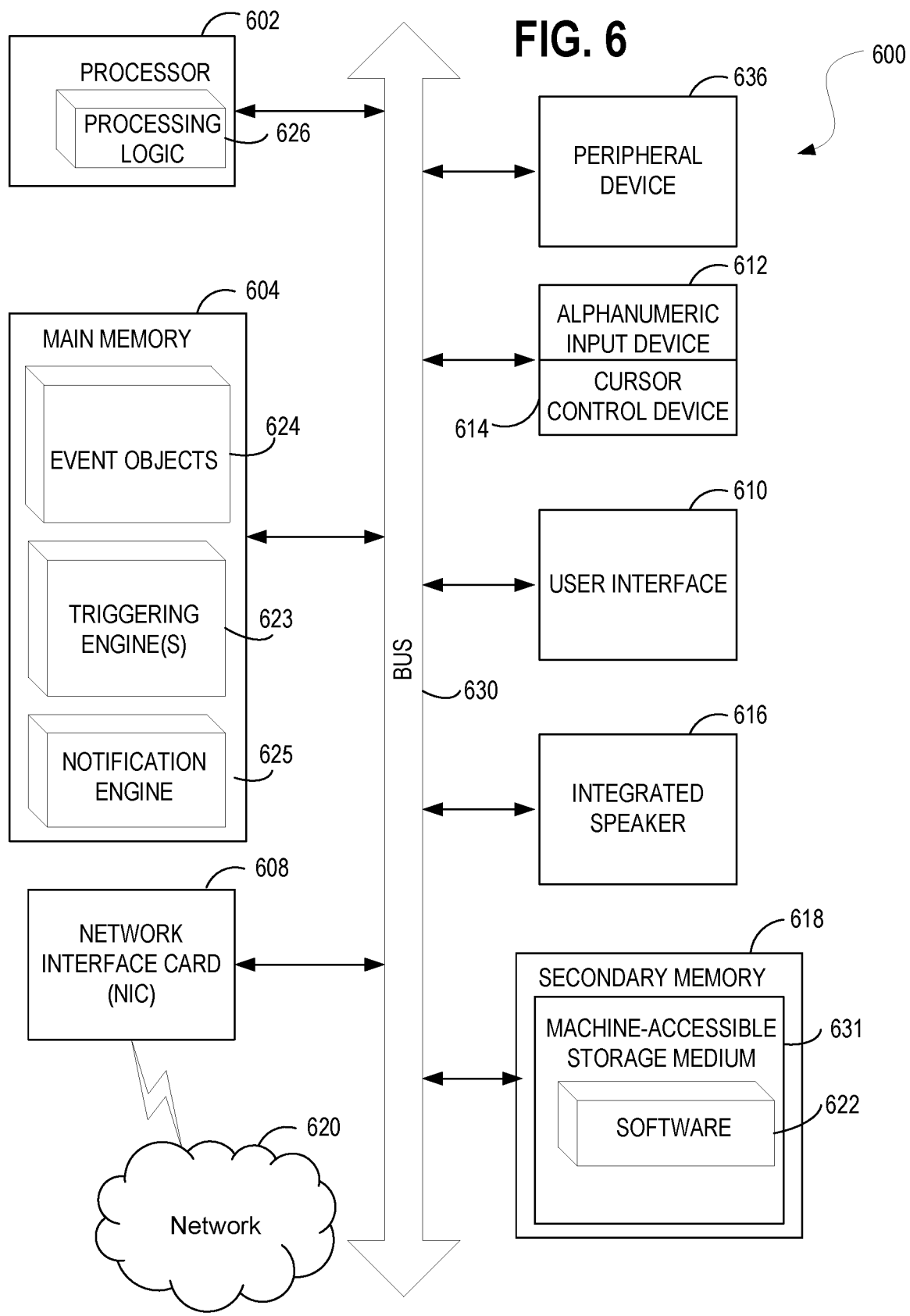

SYSTEMS, METHODS, AND APPARATUSES FOR IMPLEMENTING A WEB-BASED LIFE MANAGEMENT PLATFORM WITH USER CREATED ELECTRONIC COMMUNICATIONS TRIGGERED UPON FUTURE EVENTS

CLAIM OF PRIORITY

This U.S. utility non-provisional patent application is related to, and claims priority to the provisional utility application entitled "Systems, Methods, and Apparatuses for Implementing a Web-Based Life Management Platform with User Created Electronic Communications Triggered Upon Future Events," filed on Apr. 26, 2017, having an application No. 62/490,452, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Disclosed embodiments relate to the field of computing, and more particularly, to systems, methods, and apparatuses for implementing a web-based life management platform with user created electronic communications triggered upon future events which is operable within a computing environment such as a database system implementation supported by a processor and a memory to execute such functionality. Such means may be implemented within the computing architecture of a hosted computing environment, such as an on-demand or cloud computing environment which utilizes remotely hosted on-demand database technologies, client-server technologies, traditional locally hosted database technologies, or other computing architecture in support of the hosted computing environment.

BACKGROUND

The subject matter discussed in the background section shall not be assumed to be prior art merely as a result of its mention in the background section. Similarly, a problem mentioned in the background section or associated with the subject matter of the background section are not to be assumed as having been previously recognized in the prior art. The subject matter in the background section merely represents different approaches, which in and of themselves may also correspond to the claimed embodiments.

There are presently available a multitude of on-line storage systems available to the public. For instance, there are web-based platforms for storing documents, files, music, photos, video, etc. There are also cloud-based platforms which perform archival of locally stored files, thus permitting users to have a locally stored copy accessible to them while having the additional data resiliency knowing that such locally stored copies are "backed up" or archived to a remote cloud based storage facility.

Such capabilities are extremely useful to the user community and are widely recognized as providing for an improved user experience and for promoting greater and simpler adoption of data archival and redundancy practices.

Such services are, by their nature, highly secure and implement extensive data intrusion counter-measures and computing security measures to ensure that data backed up or remotely stored from a user's local devices is safe and secure. Such an approach is necessary for data archival and remote-storage platforms.

Unfortunately, life is unpredictable, and sometimes it becomes necessary to manage or access such files in the event of a life event of a user, such as a car accident, unexpected illness, death, etc. Unfortunately, the legitimate security measures implemented with respect to cloud-based data archival and remote-storage platforms runs counter to the ability of family members, loved-ones, or specified representatives to gain access to information, data, and files which may be necessary in the event of a life event of a user.

The present state of the art may therefore benefit from the systems, methods, and apparatuses for implementing a web-based life management platform with user created electronic communications triggered upon future events operable within a computing environment as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 3A and 3B depict an exemplary landing page in accordance with described embodiments;

FIGS. 5A and 5B depict flow diagrams illustrating methods for implementing a web-based life management platform with user created electronic communications triggered upon future events supported by a processor and a memory to execute such functionality in accordance with described embodiments;

FIG. 6 illustrates a diagrammatic representation of a machine in the exemplary form of a computer system, in accordance with one embodiment.

DETAILED DESCRIPTION

Figure 1A:
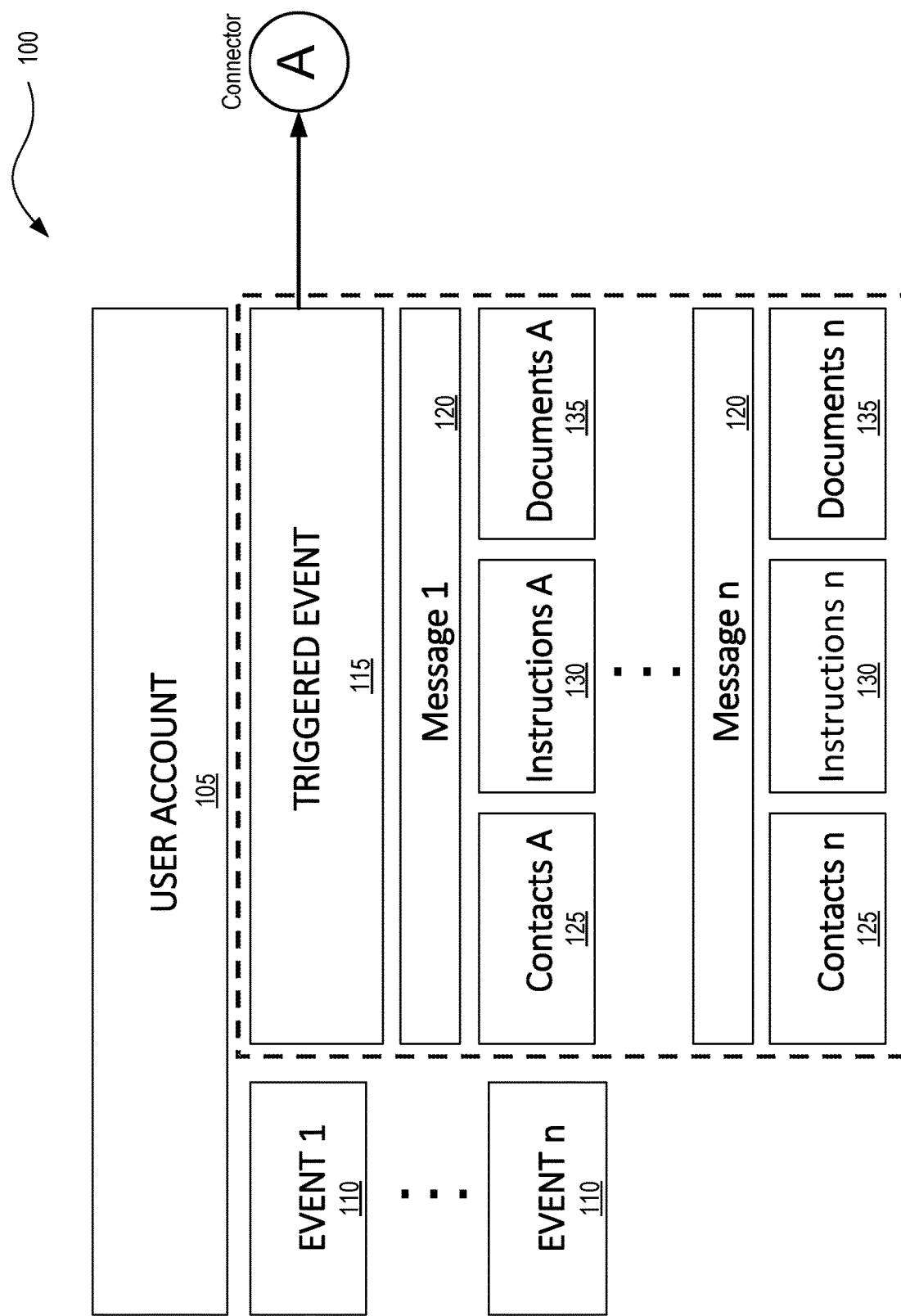
FIG. 1A depicts an exemplary architecture in accordance with described embodiments.

Described herein are systems, methods, and apparatuses for implementing a web-based life management platform with user created electronic communications triggered upon future events supported by a processor and a memory to execute such functionality. For example, there are described in accordance with certain embodiments, a method performed by a life management platform system having at least a processor and a memory therein, in which the method includes: generating a user account for a subscriber at the system; communicably interfacing with a user device over a network via a receive interface of the system, in which the user device operates remotely from the system; authenticating the subscriber via subscriber credentials received from the user device; receiving input from the user device defining each of: (i) one or more contacts, (ii) one or more messages, and (iii) one or more documents; receiving a request to configure a plan for the subscriber and configuring the plan to include (i) at least one of the one or more contacts, (ii) at least one of the one or more messages for the included contacts, and (iii) at least one of the one or more documents to be made accessible to the included contacts; defining an event trigger for the plan, in which the event trigger is to initiate execution of the plan upon occurrence of a subscriber defined event; and triggering execution of the plan at the system pursuant to determination the event trigger has occurred, in which execution of the plan includes transmitting a notice to the included contacts for the plan with a link to access the message and the one or more documents.

According to another exemplary embodiment, the web-based life management platform includes means for displaying an event creation GUI to a subscriber; creating an event responsive to input from the subscriber, in which the event specifies one or more contacts to be notified, a message to the one or more contacts to be notified, and instructions or documents or both; establishing a trigger for the event responsive to input from the user; triggering the event from the life management platform system based on the event trigger, in which the triggering of the event causes the notification of the one or more contacts, delivery of the message to the one or more contacts, and further in which the instructions and/or documents are made accessible to the one or more contacts via a secure landing page when accessed by the one or more contacts; and transmitting the instructions and/or documents from the life management platform system to the one or more contacts.

There is needed a web-based life management platform which provides for configurable user created electronic communications to be triggered and communicated with loved ones or designated individuals upon future events.

All parents understand that they have a greater level of responsibility than those without children as such parents must not only provide for their children on a day to day basis but must additionally provide for their children into the future. Unfortunately, the future is not predictable, and it is for this reason that many parents, especially those who are financial providers, obtain life insurance policies so as to ensure future financial support for their children and loved ones in the event of a tragedy such as a debilitating accident or early death.

By definition, anyone alive today has a parent, and many adults have aging parents which require their care, support, and attention. Even those individuals who do not have living parents and have no children nearly universally have loved ones in their life for whom they owe some degree of ongoing support, communication, concern, friendship, etc.

Sadly, despite the ubiquity of life insurance policies and other legal and financial instruments utilized by the populace to care for their loved ones in the event of an accident or death, the systems by which to manage, archive, and distribute such information at the time that it is needed is severely lacking in the marketplace.

The very nature of such documents makes them highly personal requiring that they often are kept confidential and private until such time that they are needed. However, such secrecy leads to the unfortunate situation in which a parent or loved one who becomes temporarily or permanently incapacitated or who dies prematurely is wholly incapable of providing such documents at the time that they are needed. Often times, life insurance policies and end of life legal instruments go unclaimed and un-followed as their existence is simply unknown or inaccessible to other family members.

As noted above, where on-line document storage services are utilized, there is a logistical disconnect between the occurrence of an event which would necessitate a person to share private documents and messages with loved ones and the ability to actually share such documents and messages.

It is therefore provided in accordance with certain embodiments, a web-based life management platform (e.g., "LifeExec") is provided as a "Software as a service" (SaaS) web-based and on-demand application hosted in a secure cloud computing environment. According to such embodiments, the web-based life management platform is extensible to a variety of internet-based platforms including browser based web sites, mobile device based web sites, and mobile applications or mobile "apps" to execute on mobile telephones and mobile tablets, etc.

According to certain embodiments, the web-based life management platform, LifeExec, provides event-triggered communications to which allows users to create electronic communications based upon future events. Such events may be considered any known occurrence happening at a future time. Certain types of events are pre-defined by the web-based life management platform including, for example, death, accident, a known date life-event, and unknown date life-event. The type of event corresponds with an "event trigger" and once the trigger requirements are satisfied, the event is then initiated within the web-based life management platform and the communications associated with or defined by such an event are then distributed.

According to other embodiments, the web-based life management platform, LifeExec, provides topic-specific content vaults, in which the platform guides users through a process by which to record a comprehensive review of their important life assets with targeted content areas as pre-defined by the platform, including content areas specific to a document vault, a password vault, and an asset vault.

According to other embodiments, the web-based life management platform, LifeExec, further implements a multi-contact independent distribution scheme. Unlike traditional electronic communication schemes, including, for example, email and SMS text messaging which distribute a single communication to a group of people. For instance, according to certain embodiments, a contextually relevant event based Customer Relationship Management (CRM) engine performs the conventional role of generating a single communication which is then distributed to multiple groups, but additionally performs multi-contact multi-messaging functions thus enabling the web-based life management platform to distribute any number of messages to any number of people or groups of people based upon a single event.

According to another embodiment, the web-based life management platform, LifeExec, overcomes the "document not present" problem which permits users to upload a document or create a virtual document placeholder by designating a "document not present" user-configurable option and then and guiding the user through the process of supplying key information about the actual physical document's contents and location, thus negating the need for such a user to actually upload the document when doing so is not desirable on the part of the user.

According to another embodiment, the web-based life management platform, implements a Secure Message Viewer (SMV) which, unlike conventional electronic communication mechanisms which distribute message content within the body of a distributed message, the secure message viewer attains a greater level of content security by redacting such message content from the body of a distributed message. For example, according to certain embodiments, the secure message viewer pushes or distributes both email and SMS text messaging notifications to contacts upon the occurrence of an event and the subsequent initiation of event communications from the platform. In accordance with such embodiments, the contacts receive both an SMS (text) and email notification of the event along with a link to the available content, but notably, they do not receive the message content with the email notification or the SMS text based notification. Rather, the contacts having received the SMS and email notifications must first login and authenticate with the Secure Message Viewer, after which they may then receive the message as well as download any associated documents.

Moreover, according to specification embodiments, the secure message viewer implements a perishable web page that includes only the content for the specific contact person receiving the notification and only the information specific to the triggered event. Other contacts may therefore receive a message which is unique to them, as well as potentially gain access to different documents for download, based on the configuration of the event and the preferences of the user (e.g., client) which configured the event and the various communication details for the specified contacts.

According to such an embodiment, access by each contact is logged as well as any documents accessed and downloaded. Because the secure message viewer web page is perishable, once the event has ended, the webpage is no longer available to the contacts, regardless of the fact that they had previously received the link and notification. In such a way, contacts never have access the user client's account or access to any information beyond what has been included in the original email or SMS text notification, which is limited simply to the notification itself and the link, which is rendered inoperable upon completion of the event.

According to another embodiment, the web-based life management platform, LifeExec, implements a contact communication tracking function to ensure that event communications are distributed and received. For instance, according to certain embodiments, the contact communication tracking function provides both proactive and reactive validation mechanisms. For example, the proactive communication tracking mechanism verifies that messages are distributed to user contacts, informing those contacts about the information on file, and requesting updates, if required. Such contacts, therefore, receive a notification informing them that they have been added to a user account. According to certain embodiments, the contacts are then additionally prompted requesting them to configure a custom interval for update notifications. Conversely, reactive communication tracking validates that messages occur subsequent to determination of a failed message delivery. For instance, where the reactive communications tracking function is utilized, an account owner is notified whenever messages are undeliverable via SMS text or email, or both. In the event of death or accident plans specifically, the identified executor is notified of any failed message transmission so as to ensure that a responsible party for the user client's account may take action to cure the message delivery faults during the course of an event communications phase. For instance, an executor is provided a secure link to distribute to the intended recipient. While the executor may, therefore, have possession of the link itself, only the intended recipient will have the necessary login credentials authenticate to the web page provided by the web-based life management platform where the message content may actually be viewed and any associated files or other documents downloaded.

According to a particular embodiment, the web-based life management platform, LifeExec, implements a data identifier function which associates tags for any stored documents or data assets affiliated with the user client's account, by assigning and tracking unique identifiers for such documents and data assets, thus resulting in every hosted document having a code uniquely identifiable code. Updates to such documents will then trigger an update the code assigned code by adding new versioning numbers to document so as to differentiate between different documents as well as to differentiate between distinct versions of the same document or other data asset. The assigned identifying codes are stored by the web-based life management platform where auditing functions, inventory functions, and tracking functions may be performed. Moreover, with the assignment of such identifying codes to all documents and data assets, even multiple documents that may exist outside of the web-based life management platform (e.g., and represented within the platform by a virtual document placeholder) may nevertheless be tracked so as to ensure that all parties can determine the most accurate document and the correct version of such a document via LifeExec platform's ledger of data identifiers.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments. In particular, there is depicted here a high level architectural view of the web-based life management platform, LifeExec, which, upon the creation of a user account 105, generates the various platform objects depicted here, including events 1 . . . event n at element 110 into which a user or subscriber may specify any actionable event 110. According to such embodiments, the actionable event 110, upon being triggered becomes triggered event 115, which then in turn operates to trigger any number of customizable messages within the web-based life management platform. For instance, depicted here are messages 1 through message n denoted by element 120.

Each message 120 forms a message group which optionally has associated with the message 120, additional platform objects including, for instance, contacts "A" at element 125, instructions 130 and documents 135. Similarly, message n at element 120 includes contacts n at element 125, instructions n at element 130 and documents n at element 135.

There may be any number of messages, message groups, contacts, instructions, and documents as deemed necessary by the user client having subscribed to the services provided by the web-based life management platform. For instance, the subscriber may link the same instructions to a previously created message group (e.g., identical instructions may be configured to go with both messages, but to different contacts and with different documents), or the subscriber may specify entirely new instructions altogether or configure different instructions for each contact. Similarly, the same or different contacts and documents may be specified. Through the graphical interface the subscriber is enabled to simply drag which objects are desired (e.g., such as contacts, instructions, and documents) for any given event as well as the default messages or customized messages, etc., which are to be associated with each contact for each triggered event.

In such a way, users are enabled to create and configure electronic communications based upon future events, whether such events are date based or based upon other occurrences, such as death, accident, fire, flood, theft, etc. The ability to configure the triggering of those events, especially in the event of death or a serious accident is described in greater detail below with respect to the subsequent figures.

As used herein, events 110 are any known event that occurs in the future, regardless of whether or not the timing for such an event is known and the time that the "event" 110 is configured within the web-based life management platform 100. Events are defined by the subscriber or user within the life management platform as pertaining to a death, an accident, any known date, any unknown date for which a manual "launch" or trigger is required, or any other definable future occurrence provided by the life management system (e.g., birth of a child, family reunion, retirement, etc.). The type of event corresponds to its "event trigger" for which there are enumerated default triggers. Certain events permit customizable triggers whereas others are not user-configurable. Once all trigger requirements are met or verified within the life management platform, the event is initiated and the communications and any associated content are distributed.

Every event includes one or more messages 120. Each single message 120 includes one or more contacts 125 and instructions 130 for those contact(s) 125. Each message may additionally and optionally specify one or more documents 135, which may be provided to the designated contact for download from a content distribution system or which may be linked to via the secure message viewer as described above, or may be defined as virtual data asset forming a placeholder for a physical document which is not uploaded into the web-based life management platform, along with a process by which the designated contact may access the corresponding physical documents.

Upon the occurrence of a triggered event 115, each contact 125 configured for that event 110 receives access to the instructions 130 and any documents 135 via a secure website or the secure message viewer.

Figure 1B:
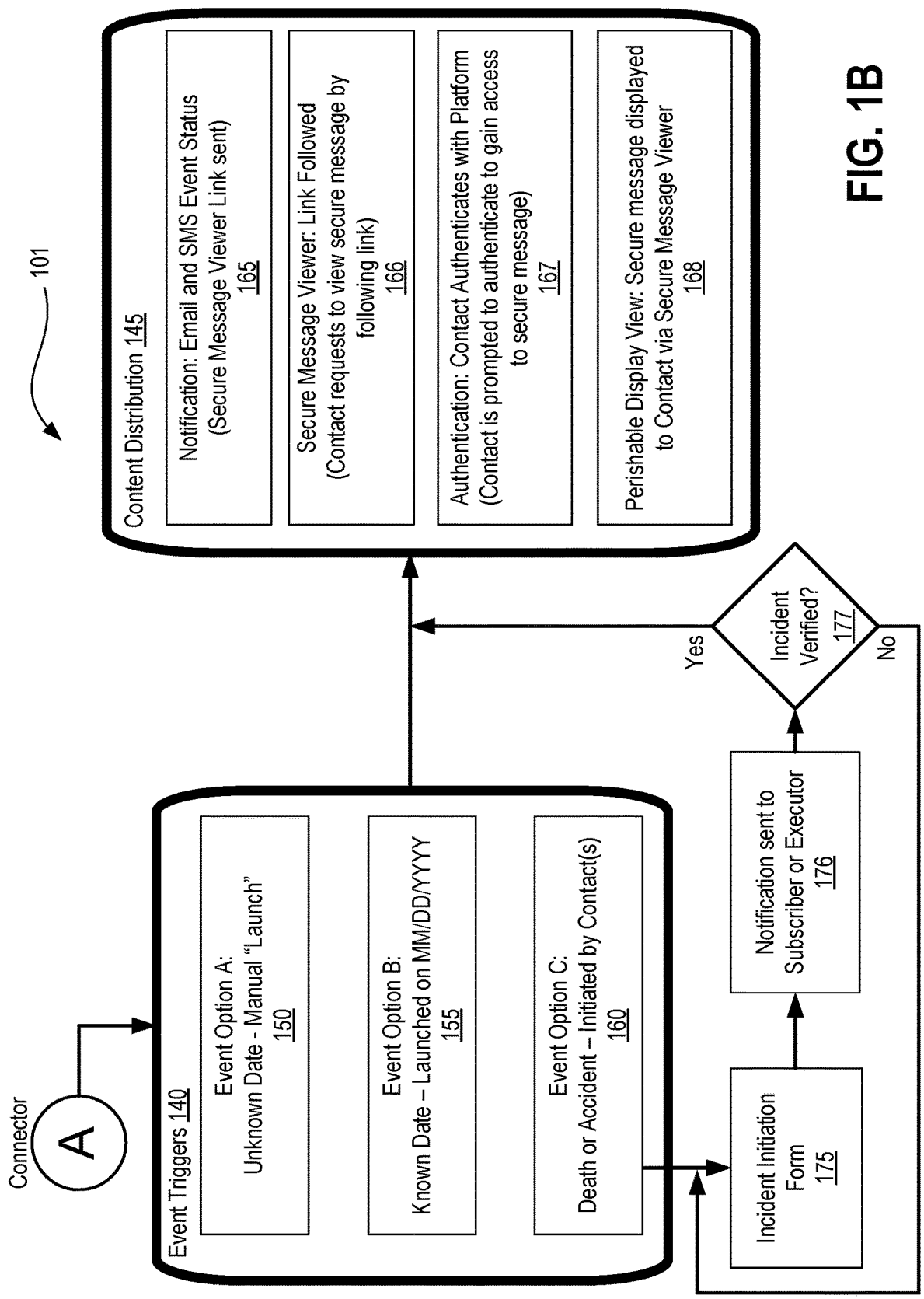
FIG. 1B depicts a continuation of the exemplary architecture in accordance with described embodiments.

As depicted here, triggered event 115 leads to connector "A" which then proceeds to FIG. 1B.

FIG. 1B depicts a continuation of the exemplary architecture 101 in accordance with described embodiments.

Beginning from connector "A" from the FIG. 1B previously described, the available event triggers 140 initiate a content distribution 145 process. As depicted here, there are several event trigger 140 options, including event option A for an unknown date requiring a manual launch of the event as depicted by element 150, event option B for a known date which will thus be automatically initiated on the known date (e.g., such as a travel event, camping trip, hiking outing, etc., which is to begin on MM/DD/YYYY as pre-determined by the subscriber) as depicted at element 155, and lastly event option C for a death or accident, requiring the event to be initiated by one of the contacts for the subscriber as depicted at element 160.

Pursuant to initiation of one of the event triggers, the life management platform will begin to distribute notifications via the content distribution process at element 145. For instance, the life management begins by providing a notification which transmits both an email and an SMS text message event status to the contacts providing a secure message viewer link to those contacts as depicted at element 165. The content distribution 145 process then continues at element 166 where the secure message viewer is invoked pursuant to the link being followed by one of the contacts thus constituting the contact requesting to view the secure message. At element 167, the contact is prompted to authenticate to gain access to the secure message, thus authenticating the contact with the platform so as to ensure that the individual following the link to the secure message is indeed the intended party. According to certain embodiments, the link by which to access the secure content page 170 may be provided via the SMS messaging, via email, or via a profile association, or some combination thereof, such that when a designated individual also having a user account logs in, the designated individual may access the information provided with the secure message for the event that was triggered.

At element 168, pursuant to successful authentication by the contact having followed the link, the perishable display view is provided to the contact via the secure message viewer within which the contact may then view the secure message. As described previously, the web page provided by the secure message viewer may be perishable insomuch that it lasts only as long as the event remains open and will become inaccessible, even for the intended contact having successfully authenticated with the platform, upon termination or conclusion of the event in question. In such a way, the subscriber's documents and information may be made accessible when necessary during such an event, but will not be needlessly exposed or made available beyond the duration of the event. Stated differently, the perishable page ceases to exist upon the conclusion of a triggered event or upon a specified access period, end date, or other event specified by the user or subscriber, such as any login by the user subscriber which would then terminate all active events.

According to certain embodiments, an incident initiation form 175 is utilized to trigger the event in question. For instance, with respect to event option C at element 160 for an accident or death type event, any contact may initiate the event via the incident initiation form 175, upon which the platform will then send a notification to the subscriber or executor, or both as depicted at element 176. If the event initiation is verified at element 177, then processing continues to the content distribution process as outlined at element 145, however, if the incident is not verified at element 177, then processing returns to the incident initiation form 175, effectively requiring that a new incident initiation form to be submitted. Pursuant to successful verification 177, the content distribution 145 begins, thus permitting access to necessary documents to the designated contacts.

Death and accident type events (e.g., option C 160) are initiated by a contact directly associated with the User's Death/Accident plan. Upon such an occurrence, a pre-designated individual (e.g., such as a spouse, child, trustee, sibling, or other loved one) verifies the contact's association via an incident form 175 provided to the individual from the life management platform. The user and/or a designated contact (referred to as an "Executor") is then notified for verification 176 of via a pre-event trigger. If the event is verified by the user or designated contact, then the content is distributed. Otherwise, the user or executor is then notified again for verification indicating a verification failure. For both death plans and also accident plans, it is permissible for an executor to initiate the death plan or the accident plan. Similarly, the subscriber, when authenticated via the subscriber's account, may initiate either the death plan or the accident plan, although pragmatically, is unlikely that the death plan would be activated via the subscriber's account, whereas the subscriber may take action to active an accident plan so long as the subscriber is well enough to login to the subscriber account.

The content distribution 145 process begins upon event verification or upon triggering of a date based or manual launch of an event. Specified contacts will receive an event notification via SMS and Email. Each SMS and Email notification includes a link to a secure content website page that includes the instructions and documents specifically designated for that individual contact pursuant to the subscriber's configured message group object. Page access is authenticated and date stamped with the contact's internet protocol (IP) address and the content page then perishes or expires when the event ends.

Notably, is not necessary for recipients of the content distribution to have or establish a login with the life management platform according to certain embodiments. Rather, messages, emails, SMS notices, and content provided by the content distribution 145 process are accessible to such designated individuals regardless of whether or not a login and profile are established and authentication may therefore be limited to use of the secure link to such content. Alternatively, authentication may include confirmation of the designated contact's name or identity based on other information, such as through two-factor authentication using a known cell phone number or other means of contact for the individual contact, with such information having been provided by the subscriber user in advance. In yet other embodiments, the recipient of the notification may have a login with the life management platform and may therefore authenticate or login with the life management platform so as to gain access to the secure message content referenced by the link.

Figure 1C:
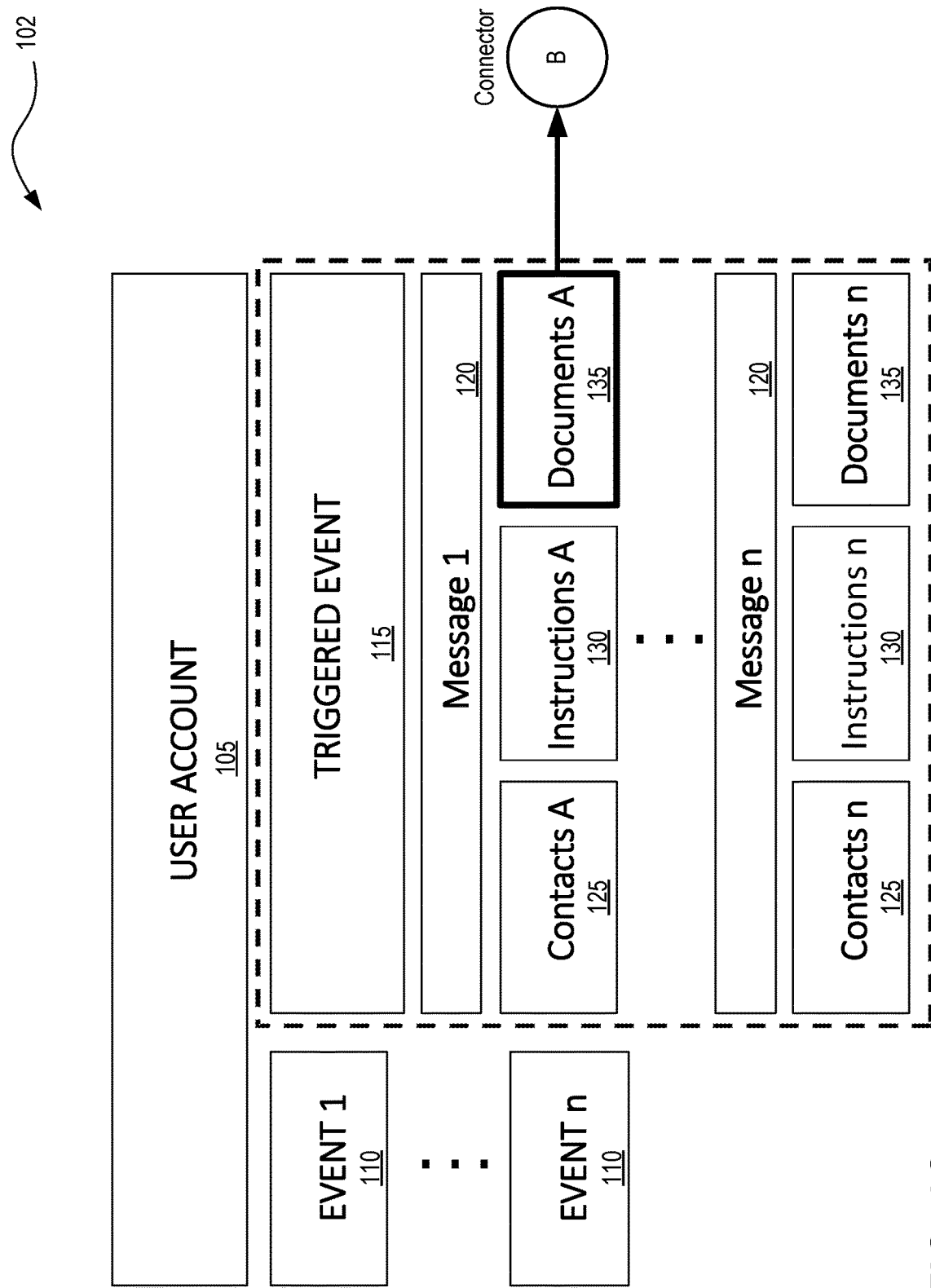
FIGS. 1C and 1D depict an extension of the exemplary architecture in accordance with described embodiments.
Figure 1D:
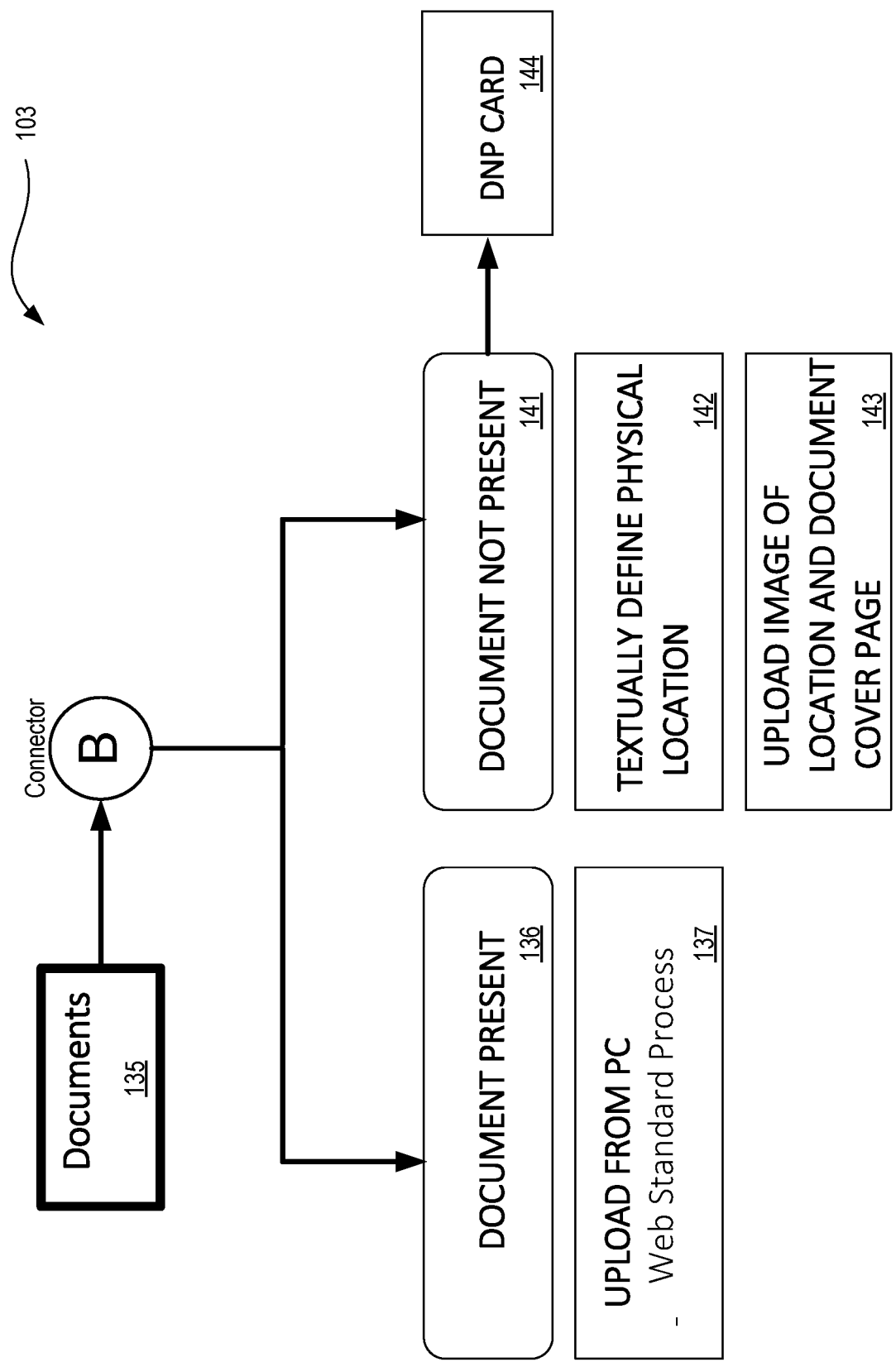

FIGS. 1C and 1D depict an extension of the exemplary architecture 102 and 103 in accordance with described embodiments.

As depicted here, the documents 135 block from FIG. 1A is again depicted, but now proceeding to connector "B" which leads to FIG. 1D. With reference to the same connector "B" at FIG. 1D, it may thus be observed that the documents 135 block leads to either a "document present" object 136 or alternatively leads to a "document not present" 141 object.

Documents are critical assets to assist with most events, especially those involving accident or death. For instance, in the event of an accident, family members designated via the contacts object will be provided through the life management platform critical documents pertaining to the event such as health insurance, medical history, and any advanced directive(s) or instructions necessary for end of life or critical condition situations where the subscriber or user is incapacitated.

Advance directives, also known as living wills, personal directives, medical directives or advance decisions, are legal documents in which a person specifies what actions should be taken for their health if they are no longer able to make decisions for themselves due to illness, accident, or incapacity. Legal instruments vary by country, with such advance directives having a recognized legal effect in the U.S. and many other countries.

A living will forms one type of advance directive, leaving instructions for treatment. Another form is a specific type of power of attorney or health care proxy, in which the person authorizes someone (such as an agent or executor) to make decisions on their behalf when they are incapacitated. Very often an individual will prepare and provide both types of documents so as to provide comprehensive guidance regarding their care and avoid the possibility of delay when such decisions must be timely made.

Users have the option to upload their document(s) into the life management platform by depositing the document(s) into the life management platform's secure storage from a PC via a standard web upload process 137 in the event the document is present 136 and available and the user indeed wishes to upload such documents into the system.

In the event the document is not present 141 or the user does not wish to place such a document on deposit with the life management platform (e.g., due to privacy concerns, etc.) then the user may instead textually define a physical location 142 of where to find such a document (e.g., such as identifying combination safe, a safety deposit box, a file cabinet, etc.) or upload a photo or image of the location 143 along with a document cover page specifically identifying the document. Both a description 142 and image 143 may also be utilized together. Such information (e.g., the description 142 and image 143) is then provided to the designated contact upon triggering of the event pursuant to any requisite verification.

In the event the document is not present 141 and the user uploads an image or provides the image, then "DNP" or "Document Not Present" care is generated in place of the physical document having at least the following form fields: a required "title for the document, an optional description of the document and its purpose, a required textual definition of the physical location 142 of the document (e.g., desk file, computer file, safe, safe deposit box, name of a lawyer having possession of such documents, etc.), and optionally a picture or image 143 of the physical location, document cover, business card pertaining to such a document, via which the designated contact may be guided to locate and obtain the necessary document.

According to one embodiment, the DNP card 144 form generates a virtual card having the DNP information encoded therein, with the DNP card being made available for download from the secure content page after an event is triggered.

For instance, such instructions may include a message to a co-worker indicating the subscriber has been in an accident along with instructions by which to access the subscriber's computer (e.g., providing a password, etc.) along with a description of where relevant files are located. Similarly, a message may be created of the neighbor indicating the subscriber has been in an accident along a message that requests the user to, for example, feed the cat or dog, take out the trash, etc. For instance, the message might say, " . . . I have been in an accident and with my family focused on me and away from home, I would sincerely appreciate your help with . . . ." In such an event, there may be no documents to be attached but rather, simply instructions provided via the message.

In such a way, the subscriber or user is enabled to organize their plan effectively based upon the specific people that are within that subscriber's particular social network. Moreover, rather than communicating via email which can expose documents and passwords and other sensitive information due to a lack of security, all documents, messages, and instructions are retained within the secure repository provided by the life management platform and only accessible upon the occurrence of an event which is configurable by the subscriber.

In another example, an expectant mother and father will know many months in advance that they are having a baby at an approximate date and thus, can create a manually triggered event for such an occurrence. Using the pre-configured manual event, the mother and father can then configure what neighbors, co-workers, family, friends, etc. are to be notified when, for example, the family leaves for the hospital, when the baby is born, etc. In such a way, the stresses of having to deal with notifying a series of contacts is eliminated as the notifications and contacts may be configured well in advance, and then simply "launched" or manually triggered via one's smartphone interface on the way to the hospital notifying others that the baby is coming or while at the hospital relaxing with the new baby upon the arrival of the newborn.

Similarly, triggers can be established for vacations and other travel, for instance, with a click of a button to manually trigger or via a specified known date, sending out pre-configured notifications and messages to pre-established contacts letting such contacts know that the subscriber is leaving for vacation or business travel and will be gone until a specified date and that, in the event of emergency (e.g., a problem with the house, etc.,) neighbors may contact the subscriber at details specified via the message. Similarly, the message provides some guidance as to when the subscriber is expected to return, for instance, from backpacking, hiking, skiing, etc., such that in the event the subscriber does not return or communicate as anticipated, some guidance is provided to others as to the last known and expected location of the subscriber.

Additionally, documents can be provided to family or others while traveling such as a copy of the subscriber's passport, driver's license, and other relevant travel documents.

Figure 2:
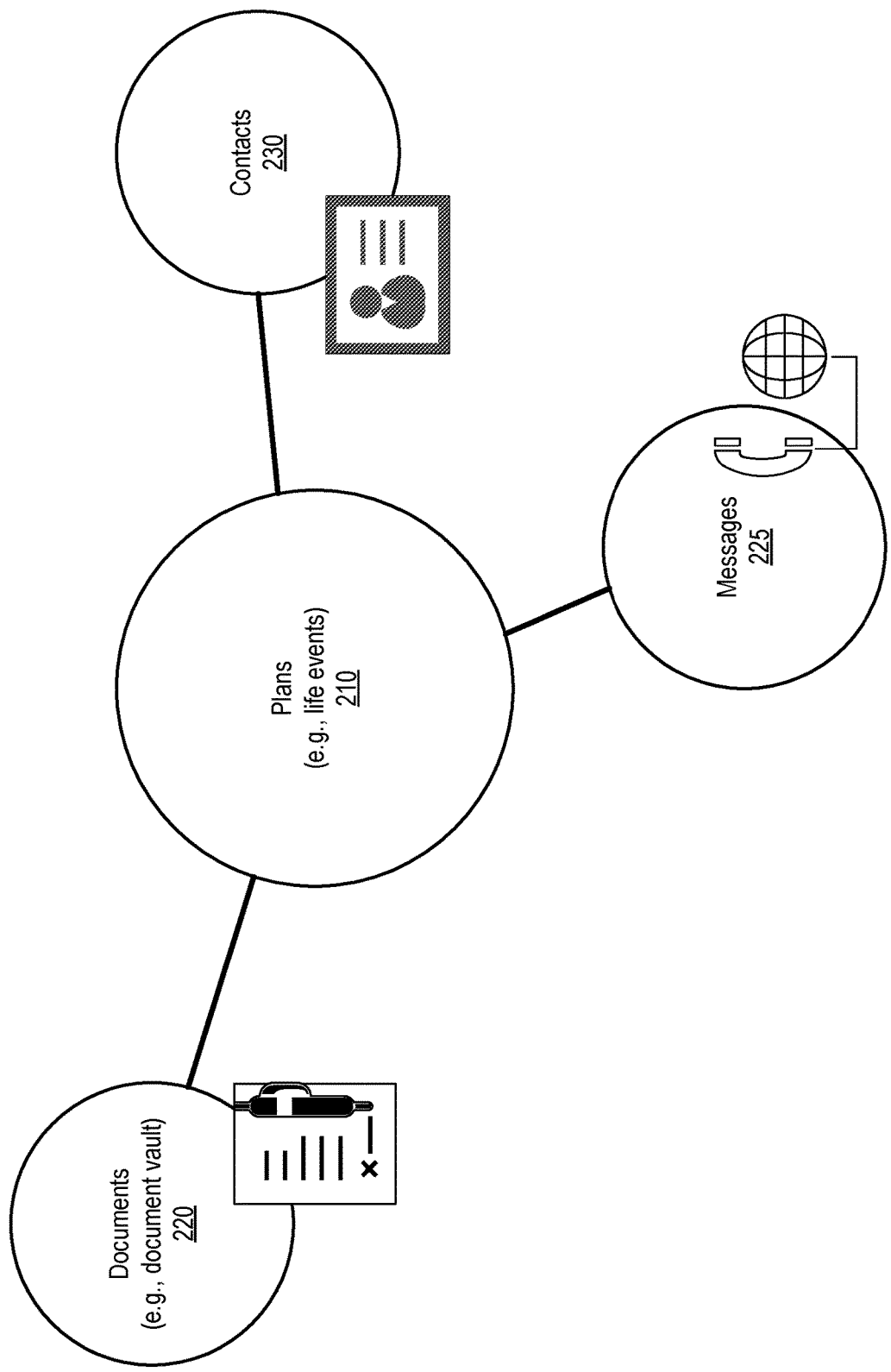
FIG. 2 depicts an alternative architectural view of the life management platform in accordance with described embodiments.

FIG. 2 depicts an alternative architectural view 201 of the life management platform. In particular, the plans 210 are depicted here as forming a hub in the center of the life management platform with the documents 220, messages 225, and contacts 230, each forming spokes connected to the plans hub 210 in the center.

The plans 210 in the center hub portion of the diagram represent life events. Such life events may be anything from an accident involving the subscriber or as mundane as a camping or hiking trip that the subscriber plans to go on. In the event of an accident, the plan 210 may be configured to notify certain individuals and provide certain documents. Similarly, for the camping or hiking trip, the subscriber may wish to notify a certain person that they are heading on a trip with additional details such as where they will be and any specific information that the subscriber wishes to share with the designated contacts.

Similarly, a death event may be created which is to then notify certain individuals, provide instructions, and share specified documents with the individuals as identified by the subscriber upon the occurrence of the event, in this example, upon the occurrence of the subscriber's verified death.

Such functionality simply does not exist within conventionally available solutions. Specifically, there is no mechanism available to the public today which provides an automated system operating as one single point of contact for all functionality associated with a given life event for the subscriber as well as a single point of entry for contacts and executors identified by the subscriber who are to then gain access to documents provided by the subscriber upon the occurrence of a specified event or follow certain instructions as specified by the subscriber.

Once the plan 210 is set up and configured by the subscriber, the process of notifying all the contacts, validating delivery of all required messaging, providing the secure message viewer link, and message and document access for the specified contacts in response to an event occurring, is entirely automated and therefore will function even when the subscriber is not available to grant access to documents and message contact stored within the life management platform.

In support of the plans 210, there is further provided a document vault. Within the document vault, the subscriber can upload any kind of document 220 they wish. Once uploaded, the documents 220 (depicted at a spoke) can then be assigned to or associated with a particular plan 210 with the documents 220 to be included in the messaging for that plan 210. There is further provided the capability to have virtual documents or placeholders for documents that the subscriber does not wish to actually upload and store within the life management platform. For example, the subscriber may have a sensitive document or something to that effect that they do not wish to store online within the document vault. For the virtual documents, the subscriber is able to define a "document not present" type, which may be a PDF formatted document according to certain embodiments, and then the subscriber includes include a picture and a title with pertinent information for the missing document as well as a description or other contextually relevant information about the contents of the document, with such information then being stored which will reference the sensitive document in such a way that the actual physical document can be located when required. In such a way, the presence of the document can be recorded within the life management platform along with information regarding how to locate and obtain that document, while at the same time, not requiring that the subscriber upload documents into the cloud which the subscriber prefers to retain in an offline only format. Other documents may not be feasibly stored by the life management platform, such as a passport, or other documents which must be in their original format to be valid.

Therefore, each document 220 provided within the document vault will be one of a digital copy of the document in question which is stored and hosted by the life management platform or alternatively, a virtual document placeholder for such a document.

Where the virtual document is utilized in place of an actual document, the subscriber can provide additional metadata about the document, a picture, a description, and where to physically find that document. For example, the subscriber may keep his physical passport in a safe, and then provide information within the virtual document hosted by the life management platform describing where to locate the passport if necessary pursuant to the occurrence of an event. For example, instructions may be provided to "look in the safe" along with a picture of the safe location or other relevant picture(s), metadata, or instructions contemplated to aid in locating the document in question.

In conjunction with documents for being included in a plan, there are further provided messages 225, depicted again at another spoke, with such messages being available to include in any of the one or more plans configured by the subscriber.

According to certain embodiments, the life management platform provides pre-templated messages for use by the subscriber, such as templates for an accident notification or bill paying instructions. The subscriber may therefore quickly configure messages using available templates offered by the platform and then proceed to modify the templates as desired, or use them as-is, or create entirely new messaging from scratch. The subscriber may create any number of messages and they may create different messages for use even with the same plan.

There are further provided at the last of the depicted spokes the contacts 230, with each contact including a first name, last name, email, and optionally a home phone and a local phone.

Unique to the contacts 230 is the ability to flag one or more of the contacts 230 specifically as an executor, with the executor contacts having specialized permissions, rights, and responsibilities for the subscriber's configured plans.

With the documents, messages, and contacts available, the subscriber may now configure a plan by associating any combination of the documents, messages and contacts with a particular plan, for example, by dragging and dropping the documents, messages, and contacts on top of an available plan. Further still, the subscriber can create message groups including one or more contacts that are to receive one individual message specified for each message group. There can be multiple message groups, and each may have a different message specified. In such a way, the subscriber can configure more than one plan message group per plan. Within each plan message group there is a specified set of documents, messages, and contacts. Therefore, for any occurrence of an event, such as an accident, there can be specifically tailored messaging for different people or different groups of people. For example, the message communicated to family members may be different than the message communicated to work colleagues, etc. Similarly, different messages may be configured and sent to the various contacts for different plans or life events. For example, messaging is likely to be different for an accident than a death.

In such a way, even with a single plan, the subscriber may nevertheless define a different series of actions and different documents to be provided to different people who are to be notified in different ways. Moreover, the same people may be notified with different messaging and provided different documents and different instructions for any number of different plans.

According to certain embodiments, different base plan templates are provided to be configured by the subscriber. These base plan templates include a generic life plans which is highly versatile and may be used for a variety of circumstances. Additionally provided is an accident plan template and then a death plan template. Still other plan templates may be provided in accordance with different embodiments.

The generic life plan may be utilized, for example, to configure a plan for the subscriber that plans to go on a hiking trip down the Pacific Coast Trail for two weeks, in which case the subscriber may wish to let close friends and family know that the subscriber is going on such a trip as well as pertinent information about the trip, in the event the subscriber becomes lost, etc. For instance, location information could be shared through the life management platform to specified contacts associated with the subscriber. Because such contacts likely would already be present within the life management platform and associated with the subscriber's profile, it would be a simple matter for the subscriber to configure the generic life event plan to specify such a hiking trip and simply drag and drop in to the generic life event plan the relevant contacts along with briefly customized messaging and relevant documents that the subscriber believes are relevant to such a plan, such as emergency contact information, etc.

According to such an embodiment, the subscriber may define a start date and an end date when the plan is created. While optional, of the subscriber knows the start and end dates then upon the occurrence of such events, the plan is automatically executed, meaning that all messaging is sent out as defined by the plan message groups. Similarly, if an end date is known and specified, then the plan will automatically terminate upon the occurrence of that end date, thus terminating any access to documents provided to the contacts pursuant to execution of the plan.

Alternatively, if the subscriber does not know the begin date or the end date, then the subscriber may instead log in to the account and manually start a configured life event plan or terminate a presently executing life event plan. Therefore, there are two distinct methods of initiating a life event plan.

Further provided as templates are the accident plan and the death plan. For such plans, the subscriber configures a set of validation rules, because due to the nature of such events, it cannot be known when an accident or unexpected death may occur.

Because there are no start and end dates configurable for accident and death events, and because it would be pointless to require the subscriber to login and manually initiate a death plan, there are instead a set of configured validation rules which must be satisfied before an accident or death plan may actually initiate thus triggering the messaging distribution and providing access to the documents configured for such an accident or death plan.

According to described embodiments, there are three validation schemes provided for the initiation of accident and death plans via the life management platform.

A first of the three is self-validation. It is conceivable that the subscriber has been involved in an accident, yet may nevertheless be able to login and authenticate the accident life event plan through the life management platform. In such a situation, where the accident plan is initiated through the subscriber's authenticated account, it will automatically be validated and therefore advance to the content distribution phase to transmit messages to the configured contacts.

Alternatively, it is possible that a contact reports via the incident form that the subscriber has been involved in an accident, and the subscriber may respond to the incident form with a confirmation to validate the occurrence of the accident, thus triggering the accident life event and thus beginning the distribution phase to transmit messages to the configured contacts. In either event, self validation is permissible and because the subscriber has ultimate authority for the account, no further validation is required.

Therefore, a second validation mechanism is provided according to another embodiment, in which a contact has been flagged as an executor for the subscriber with authority to validate. Where executors are configured by the subscriber, then any incident form reported by any contact of the subscriber will be transmitted to both the account subscriber as well as any and all executors. As before, the subscriber has authority to self-validate the occurrence of a life event, thus beginning the content distribution phase. However, the executor may similarly receive the message and confirm that indeed a specified life event has occurred (e.g., an accident or a death) and because the executor has authority to validate, the content distribution phase will then begin.

For example, in the event of a serious accident or death, the subscriber will not be able to self-validate, and therefore, the executor will serve the function of gate-keeper for the validation process. The executor is also a contact and therefore, an executor may both submit an incident form and then validate the same incident form to begin the content distribution process or the executor may validate an incident form submitted by another contact associated with the subscriber. In either event, the content distribution process begins upon validation of a life event.

A third mechanism to validate a submitted incident form is pursuant to a complete lack of validation of a submitted incident form or rejection of a submitted incident form after a time-out period. For example, if an incident form is submitted by any contact then the subscriber will be notified as well as all executors configured for that subscriber. If the incident form is rejected, then the process simply terminates. However, it is possible that the incident form is legitimate and therefore, if the subscriber and all executors fail to respond within a configurable amount of time specified by the subscriber at the time the plan was created, then automatic validation will occur after that time-out period, thus beginning the content distribution phase to transmit messages to the configured contacts. Such automated validation is at the discretion of the subscriber at the time that the accident plan or death plan is configured via the platform.

According to the described embodiments, an incident form may only be submitted by an individual configured within the subscriber's group of contacts within the life management platform. Conversely, in other embodiments, non-defined contacts may submit an incident report where they have a verifiable connection with the subscriber, such as social media connections, connections for which there is documented recent email correspondence, etc. Again, such considerations are configurable by the subscriber and may be made to be more lenient or increasingly stringent at the preference of the subscriber configuring the plans.

Therefore, according to such an embodiment, a permissible contact completes the incident form via an on-line hosted GUI provided by the life management platform and then submits the information to the life management platform against a given plan type. For instance, the contact may indicate the subscriber was in a car accident or indicate that the subscriber was expected to return from a camping trip, but has not yet returned, etc.

Regardless, the information is transmitted to the life management platform which takes the report information and then sends out messaging to the account owner and to any contacts ad designated as executors for the purposes of validation. If the subscriber who is the account owner sees such messages then hey may simply log in to the account and either approve or deny the reporting of that report. Conversely, an account executor is provided a link via the email which will direct the executor to an authentication site to authenticate the identity of the executor, at which point the executor will then also have the opportunity to approve or deny the report based on the details provided in the report.

For each plan message group, the life management platform sends a link in both SMS text format and email format to each of those contacts identified with a link to the secure message viewer. Optionally, a link may be provided to the contacts via social network private messaging. When the contact follows the link they are prompted to authenticate their identity with the life management platform, and upon successful authentication, the contact will then gain access to secure content of the message via the secure message viewer.

Within the secure message viewer the contact will have access to all of the messaging that was associated or assigned to that plan message group for that plan and the contact will additionally have access to any documents that were configured for that plan message group. From the secure message viewer, the contact may therefore read the secure message, read any provided instructions, view any documents, download documents, and view pictures and other metadata or DNP type documents associated with the plan message group.

In such a way, access to the secure content of the message and documents requires two parts to be satisfied by the contact. Firstly, the contact must actually receive the link via the SMS text or email message, or in certain message validation schemes, the link may be provided by an executor to the contact when the contact's SMS text and email fail to receive the automated messaging sent by the life management platform. Regardless, once the contact has possession of the link, the link may be followed which will invoke the secure message viewer which will then prompt the contact for the second required part to be satisfied, specifically, authentication to attest that the contact is the correct person. Authentication may be done via a username and password login to the life management platform or via another authentication scheme where the contact lacks a log in with the platform, such as receiving a text message at a known cell number or receiving a social media message through a social media platform, etc. According to another embodiment, the contact may upload a copy of their photo ID to customer support for the life management platform who will then authenticate the contact and grant access to the secure message viewer, assuming they have a correct and legitimate link to the secure message.

If either the link cannot be decrypted correctly or the contact fails to authenticate, then they cannot view the secure message content or download any provided documents.

Figure 3B:
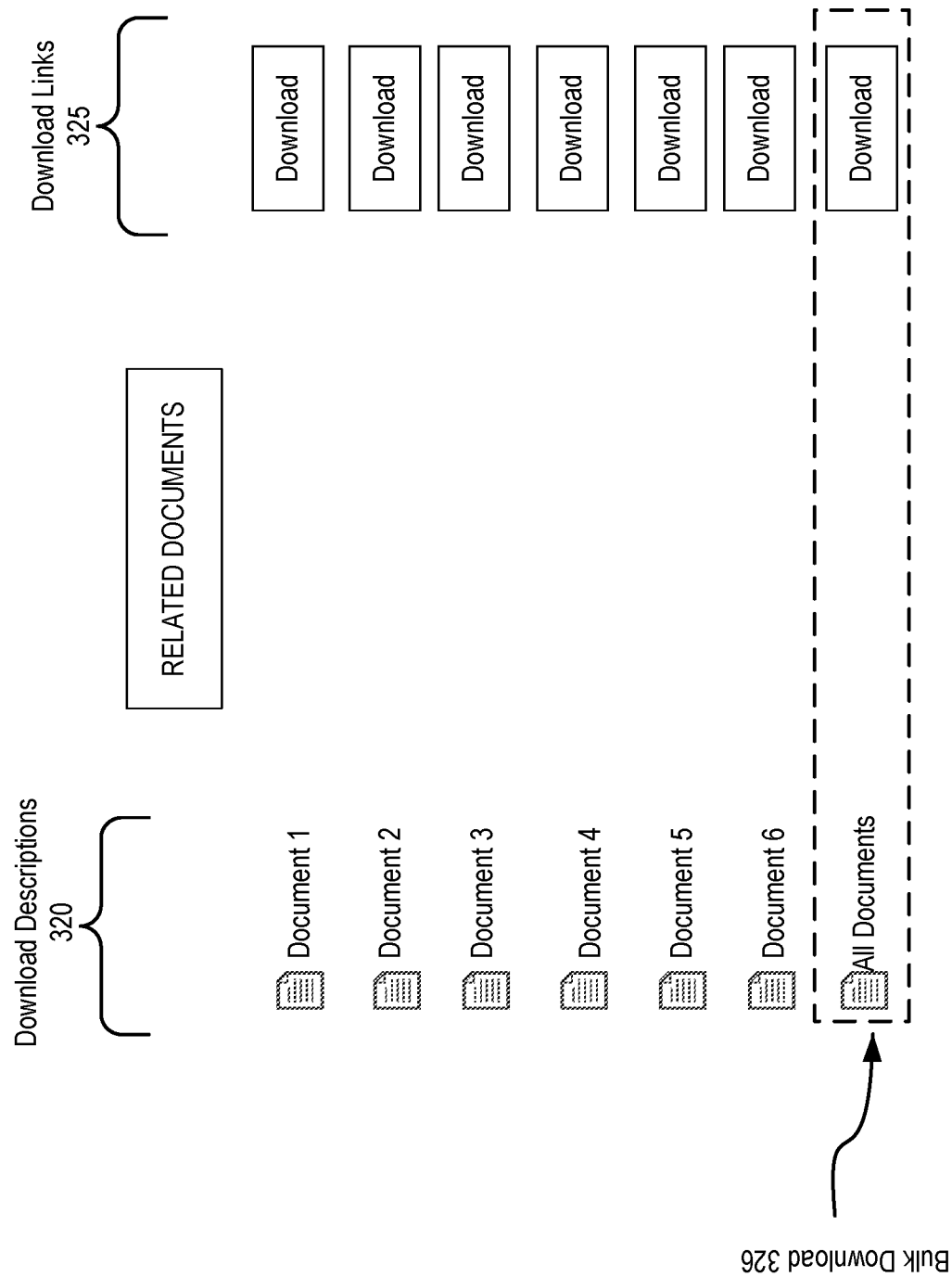

FIGS. 3A and 3B depict an exemplary landing page 305 in accordance with described embodiments.

Specifically shown at FIG. 3A is the activation of an "accident plan" indicating that instructions are provided from the user or subscriber, "John Doe," and in which the message contents 310 provide the specific communication from the user or subscriber configuration and authored at the time the event was initially created within the life management platform by the user.

Further depicted by the continuation of the landing page 305 at FIG. 3B are various document descriptions 320 (e.g., titles, etc.) and associated download links 325 for documents or "Document Not Present" (DNP) cards made accessible to the recipient of the link via which the landing page 305 is accessed. A bulk download 326 is optionally provided for the contact to conveniently download all available documents.

Figure 4:
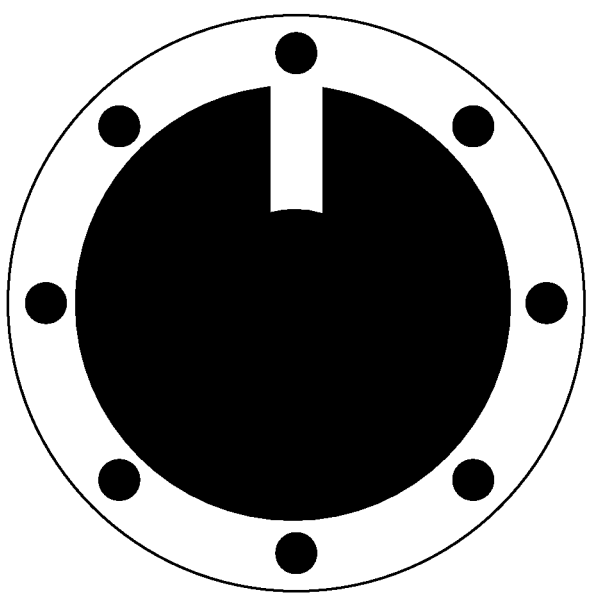
FIG. 4 depicts a password vault and a reminder system in accordance with described embodiments.

FIG. 4 depicts a password vault 410 and a reminder system 420 in accordance with described embodiments. In particular, the reminder system may be utilized to have the life management platform automatically prompt the subscriber to update passwords as well as audit contact information for configured contacts, for instance, by sending a test SMS text message or a test email. In the event of message delivery failure, the life management platform will then notify the subscriber who can take appropriate action to update the relevant contact information before it is needed as part of a true life event.

For instance, the life management platform may be configured to provide reminders on Christmas, birthdays, holidays, etc. Moreover, the subscriber may create reminder messages to himself or reminder messages to contacts, which may be utilized to test the validity of such contact's email and SMS text messaging. For instance, the subscriber may utilize a template or create a reminder from scratch with a date, recurring frequency, if any, a title, and a reminder message, along with contacts to be reminded or simply an indication that the reminder is only to the subscriber.

When the scheduled reminder time is reached, the life management platform will then send out the reminder in the same manner as is done with the content distribution scheme, thus providing a real-world test of the provided contact information for the configured contacts associated with the subscriber's account and any plans or configured life events.

The password vault 410 provides a mechanism by which the life management platform will securely store password information for a website or for just about anything that would require a password. The subscriber may define a title, provide a description, provide a URL or other location information, if applicable, as well as provide the username and password information. According to described embodiments, such password information may be shared from the password vault at the discretion of the subscriber by dragging and dropping the password object from the password vault and into a configured plan, similar to associating messages and contacts with such a plan.

Figure 5A:
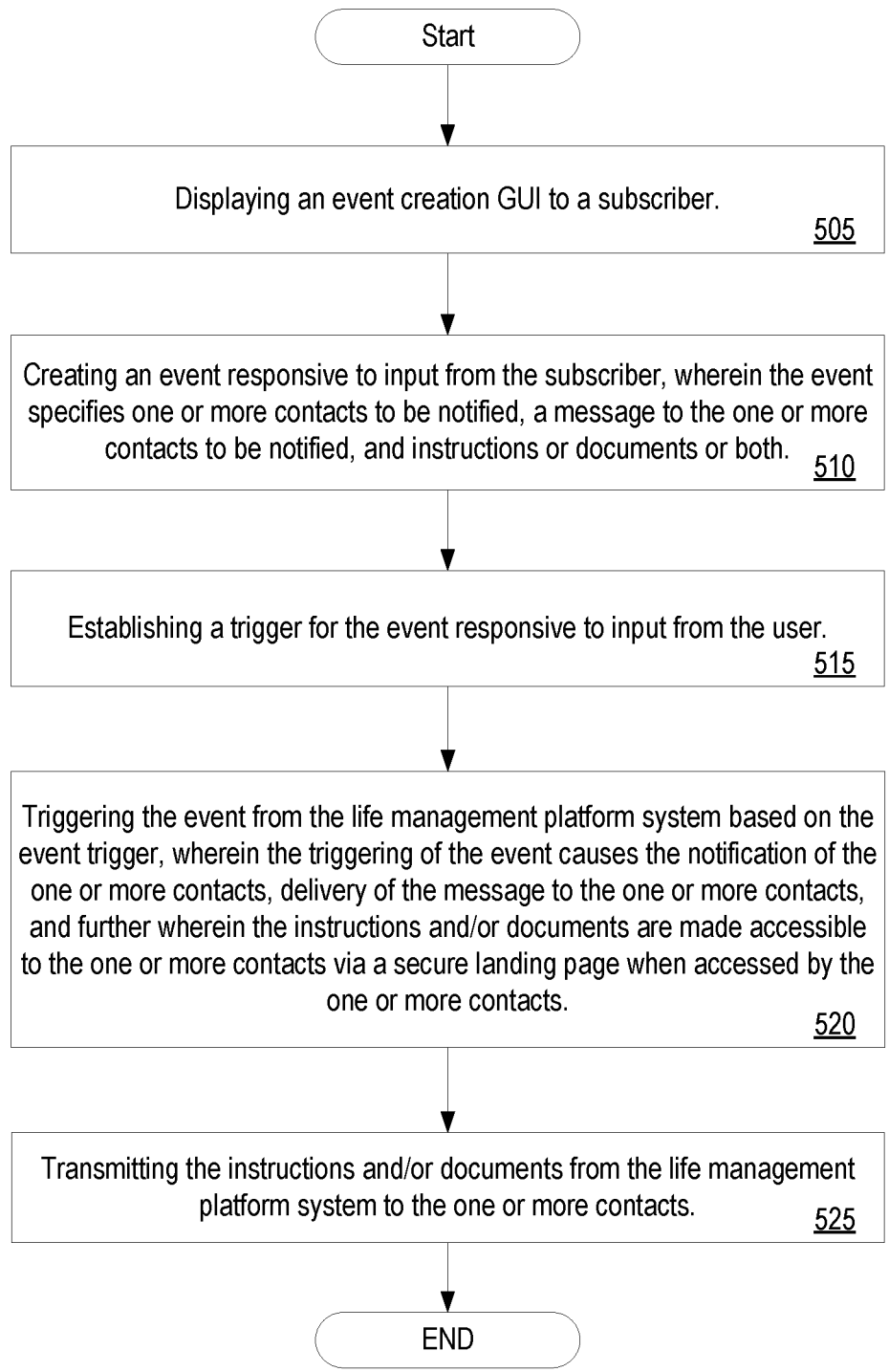

FIGS. 5A and 5B depict flow diagrams illustrating methods 500 and 501 for implementing a web-based life management platform with user created electronic communications triggered upon future events supported by a processor and a memory to execute such functionality in accordance with described embodiments; and Methods 500 and 501 may be performed by processing logic that may include hardware (e.g., circuitry, dedicated logic, programmable logic, microcode, etc.), software (e.g., instructions run on a processing device) to perform various operations such as displaying, creating, establishing, triggering, transmitting, communicating, interfacing, instructing, receiving, assigning, synchronizing, exposing, loading, executing, operating, generating, storing, maintaining, returning, presenting, processing, providing, determining, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

With reference to the method 500 depicted at FIG. 5A, at block 505, processing logic displays an event creation GUI to a subscriber.

At block 510, processing logic creates an event responsive to input from the subscriber, in which the event specifies one or more contacts to be notified, a message to the one or more contacts to be notified, and instructions or documents or both.

At block 515, processing logic establishes a trigger for the event responsive to input from the user.

At block 520, processing logic triggers the event from the life management platform system based on the event trigger, in which the triggering of the event causes the notification of the one or more contacts, delivery of the message to the one or more contacts. According to such an embodiment, the instructions and/or documents are made accessible to the one or more contacts via a secure landing page when accessed by the one or more contacts.

At block 525, processing logic transmits the instructions and/or documents from the life management platform system to the one or more contacts.

According to another embodiment of method 500, the event includes one of: an accident event; a death event; a travel plan event; a newborn baby event; a birthday event; or a wedding event.

According to another embodiment of method 500, the trigger includes one of: a manually triggered event responsive to an input from the subscriber; an automatically triggered event based on a known date specified by the subscriber; or a verification required event triggered responsive to at least one of the contacts requesting initiation of the event.

With reference to the method 501 depicted at FIG. 5B, at block 550, processing logic generates a user account for a subscriber at the system.

At block 555, processing logic communicably interfaces with a user device over a network via a receive interface of the system, wherein the user device operates remotely from the system.

At block 560, processing logic authenticates the subscriber via subscriber credentials received from the user device.

At block 565, processing logic receives input from the user device defining each of: (i) one or more contacts, (ii) one or more messages, and (iii) one or more documents.

At block 570, processing logic receives a request to configure a plan for the subscriber and configuring the plan to include (i) at least one of the one or more contacts, (ii) at least one of the one or more messages for the included contacts, and (iii) at least one of the one or more documents to be made accessible to the included contacts.

At block 575, processing logic defines an event trigger for the plan, wherein the event trigger is to initiate execution of the plan upon occurrence of a subscriber defined event.

At block 580, processing logic triggers execution of the plan at the system pursuant to determination the event trigger has occurred, wherein execution of the plan includes transmitting a notice to the included contacts for the plan with a link to access the message and the one or more documents.

According to another embodiment of method 501, the notice transmitted to the included contacts for the plan does not include either the message or the documents to be made accessible to the included contacts; and in which the link included with the notice instantiates a Secure Message Viewer (SMV) when followed; and in which the message is viewable within the Secure Message Viewer and the documents are accessible for download via the Secure Message Viewer subsequent to successful authentication of one of the contacts via the Secure Message Viewer.

According to another embodiment, method 501 further includes: receiving the link at the receive interface of the system from a second user device; instantiating a Secure Message Viewer (SMV) to execute at the second user device; prompting one of the included contacts for the plan to authenticate with the system via the Secure Message Viewer, in which the included contact to authenticate is uniquely associated with the link received at the system; receiving authentication credentials via the Secure Message Viewer executing at the second user device successfully validating the included contact's identity; and displaying an event landing page to the second user device via the Secure Message Viewer, in which the event landing page displays at least the message for the included contacts of the plan and one or more documents accessible for download.

According to another embodiment of method 501, authentication via the Secure Message Viewer executing at the second user device fails pursuant to any one of: receiving a malformed link at the system; receiving an expired link at the system; receiving the link at the system in an encrypted form and failing to decrypt the link at the system; receiving authentication credentials which do not match an included user for the plan; receiving authentication credentials which do not match an included user uniquely associated with the link received; and in which the method further includes: re-prompting the second user device to authenticate with the system via the Secure Message Viewer until valid authentication credentials are received and denying access to the message and the documents until successful validation occurs.

According to another embodiment, method 501 further includes: receiving the link at the receive interface of the system from one of the included contacts for the plan; in which the included contact is not registered with the system and in which the included contact lacks both a login id and a login password to authenticate with the system; and authenticating the included contact with the system without creating the login id or the login password for the included contact.

According to another embodiment of method 501, authenticating the included contact with the system includes: identifying which one of the one or more included contacts corresponds to the link received; retrieving an email address and a cell phone number from the included contact, in which the email address and the cell phone number are defined by the subscriber via the input defining the one or more contacts; sending a two-factor authentication code to one or both of the email address and the cell phone number via SMS text format based on the included contact identified as corresponding to the link received; prompting for the two-factor authentication code to be entered by the included contact; and successfully authenticating the included contact when the two-factor authentication code entered by the included contact matches the two-factor authentication code sent.

According to another embodiment of method 501, authenticating the included contact with the system includes: identifying which one of the one or more included contacts corresponds to the link received; determining the included contact is connected with the subscriber via a social networking platform; prompting the included contact to authenticate via the included contact's credentials for the social networking platform; and successfully authenticating the included contact with the system when the included contact correctly authenticates with the social networking platform using a social network platform identity connected with the subscriber's social networking platform identity on the same social networking platform.

According to another embodiment of method 501, receiving the request to configure the plan and configuring the plan to include the contacts, the messages, and the documents includes: displaying a configuration GUI to the subscriber via the user device communicably interfaced with the system; and receiving subscriber configuration input via the configuration GUI to configure the plan, in which the subscriber configuration input includes one or more of: (i) subscriber configuration input assigning at least one contact to the plan and assigning at least one message to the be displayed to the contact and assigning at least one document to be made accessible to the contact; (ii) subscriber configuration input creating a message group for the plan and subscriber configuration input assigning multiple contacts to the message group for the plan and assigning a message to the be displayed to the message group for the plan and assigning one or more documents to be made accessible to all of the multiple contacts of the message group; and (iii) subscriber configuration input creating multiple message groups for the plan, in which each of the multiple message groups include one or more of the contacts, in which each of the multiple message groups include a message to the be displayed to each respective message group, in which each message to be displayed to the respective message groups is distinct, and in which each of the multiple message groups further specifies one or more documents to be made accessible to the included one or more contacts of each respective message group.

According to another embodiment of method 501, the plan includes an accident plan; and in which the event trigger defined for the plan to initiate execution of the plan includes at least one of the following: (i) receiving a manual start request for the accident plan from the subscriber's authenticated account; (ii) receiving an incident initiation form from any of the one or more contacts included in the plan followed by an approval to validate the incident initiation form from the subscriber's authenticated account; (iii) receiving the incident initiation form from one of the included contact's authenticated account having "executor" authority on behalf of the subscriber followed by an approval to validate the incident initiation form from the contact's authenticated account having "executor" authority; and (iv) receiving the incident initiation form from any of the one or more contacts included in the plan followed by an approval to validate the incident initiation form from the contact's authenticated account having "executor" authority.

According to another embodiment of method 501, the plan includes an accident plan; in which the plan includes a subscriber configured and subscriber activated optional time-out period; and in which triggering execution of the plan at the system pursuant to determination the event trigger has occurred includes: receiving an incident initiation form from any of the one or more contacts included in the plan; monitoring for an approval of the incident initiation form from the subscriber's authenticated account or from one of the included contact's authenticated account having "executor" authority on behalf of the subscriber for the duration of the time-out period following submission of the incident initiation form; and automatically triggering execution of the plan at the system without approval of the incident initiation form after the time-out period has elapsed.

According to another embodiment of method 501, the plan includes a death plan; and in which the event trigger defined for the plan to initiate execution of the plan includes at least one of the following: (i) receiving an incident initiation form from any of the one or more contacts included in the plan followed by an affirmative denial invalidating the incident initiation form from the subscriber's authenticated account and preventing the triggering of the plan execution; (ii) receiving an incident initiation form from one of the included contact's authenticated account having "executor" authority on behalf of the subscriber followed by an approval to validate the incident initiation form from the contact's authenticated account having "executor" authority; and (iii) receiving the incident initiation form from any of the one or more contacts included in the plan followed by an approval to validate the incident initiation form from the contact's authenticated account having "executor" authority.

According to another embodiment of method 501, the plan includes a generic plan; and in which the event trigger defined for the plan to initiate execution of the plan includes at least one of the following: (i) receiving a manual start request for the generic plan from the subscriber's authenticated account; and (ii) receiving subscriber configuration input specifying a begin date and automatically beginning the generic plan on the date specified by the subscriber configuration input.

According to another embodiment, method 501 further includes: terminating execution of the generic plan pursuant at least one of the following: (i) receiving a manual end request for the executing generic plan from the subscriber's authenticated account; and (ii) receiving subscriber configuration input specifying an end date and automatically ending the generic plan on the date specified by the subscriber configuration input.

According to another embodiment of method 501, each of the one or more documents include at least one of: a digital asset; a digital document; a digitized representation of a physical document; a "Document Not Present" (DNP) type document specifying a DNP description and a DNP location for a physical document.

According to another embodiment of method 501, the system implements a life management platform; in which the life management platform executes via the processor and the memory of the system providing on-demand cloud based services to a plurality of subscribers; and in which each of the subscribers communicate with the life management platform system via a computing device which is remote from the life management platform and communicably interfaced with the life management platform via a public Internet.

According to another embodiment of method 501, each of the plurality of subscribers own a user account within the life management platform; and in which each user account includes at least: a plurality of contacts defined by the subscriber; a plurality of messages defined by the subscriber; and one or more life events defined as one or more corresponding plans configured by the subscriber, each plan including a subscriber configurable event trigger for the respective plan.

According to a particular embodiment, there is a non-transitory computer readable storage media having instructions stored thereupon that, when executed by a system having at least a processor and a memory therein, the instructions cause the system to perform instructions including: generating a user account for a subscriber at the system; communicably interfacing with a user device over a network via a receive interface of the system, in which the user device operates remotely from the system; authenticating the subscriber via subscriber credentials received from the user device; receiving input from the user device defining each of: (i) one or more contacts, (ii) one or more messages, and (iii) one or more documents; receiving a request to configure a plan for the subscriber and configuring the plan to include (i) at least one of the one or more contacts, (ii) at least one of the one or more messages for the included contacts, and (iii) at least one of the one or more documents to be made accessible to the included contacts; defining an event trigger for the plan, in which the event trigger is to initiate execution of the plan upon occurrence of a subscriber defined event; and triggering execution of the plan at the system pursuant to determination the event trigger has occurred, in which execution of the plan includes transmitting a notice to the included contacts for the plan with a link to access the message and the one or more documents.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes event objects 624 which store created objects on behalf of the subscriber including configurable triggers, contacts, messages and documents or links to such documents. Further within main memory 604 are triggering engines 623 and a notification engine 625 by which to trigger previously configured events and notify contacts pursuant to the event object 624 configuration being triggered. Main memory 604 and its sub-elements are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

Figure 7:
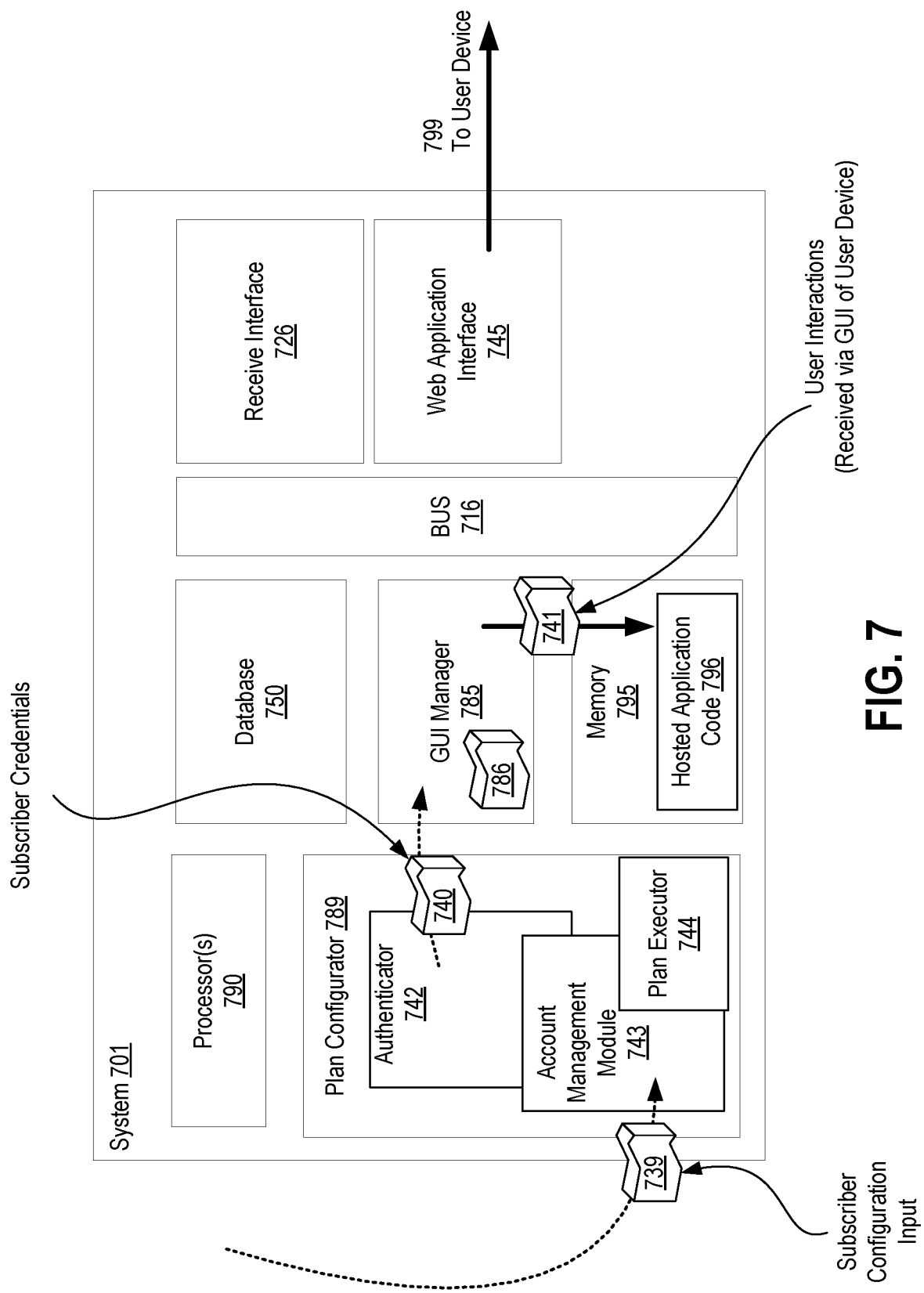
FIG. 7 shows a diagrammatic representation of a system within which embodiments may operate, be installed, integrated, or configured in accordance with described embodiments.

FIG. 7 shows a diagrammatic representation of a system 701 within which embodiments may operate, be installed, integrated, or configured. In accordance with one embodiment, there is a system 701 having at least a processor 790 and a memory 795 therein to execute implementing application code 796 for the methodologies as described herein. Such a system 701 may communicatively interface with and cooperatively execute with the benefit of a hosted computing environment, such as a host organization, an on-demand service provider, a cloud based service provider, a client-server environment, etc.

According to the depicted embodiment, the system 701, which may operate within a host organization, includes the processor 790 and the memory 795 to execute instructions at the system 701. According to such an embodiment, the system 701 further includes: a hosted application to implement a life management platform to be executed via the processor 790 of the system 701 at the host organization, in which the hosted application includes a Graphical User Interface (GUI) which is transmitted to a remote user device via a GUI manager 785 on behalf of the hosted application 796, further in which the hosted application 796 is to receive user interactions. Such a system 701 further includes a web application interface 745 to transmit the GUI 786 (e.g., via the GUI manager 785) to a user device 799 remote from the host organization, in which the GUI 786 is to be displayed to the user device 799 and receive the user interactions 741 as input at the displayed GUI of the user device 799; a receive interface 726 is to receive, at the host organization, subscriber configuration input 739 to configure the subscriber's plans, contacts, messages and documents with the hosted application received via the GUI displayed to the user device; a plan configurator 789 within which there is further an authenticator 742 to receive and authenticate subscriber credentials or credentials provided by contacts. Additionally includes is an account management module 743 to manage the subscriber's account and other user accounts based on configuration information and received inputs. Notifications, alerts, secure messages, prompts, and other interactions are pushed from the host organization or the system 701 to the user device 799 over the web application interface 745 for display at the user device.

According to another embodiment of the system 701, the receive interface 726 communicates with a user client device 799 remote from the system and communicatively links the user device with the system via a public Internet. According to such an embodiment, the system operates at a host organization as a cloud based service provider to the user device 799; in which the cloud based service provider hosts a receive interface 726 exposed to the user client device via the public Internet, and further in which the receive interface receives inputs from the user device as a request for services from the cloud based service provider.

According to another embodiment, the system 701 implements a life management platform, which includes: a memory to store instructions; a processor 790 to execute the instructions; an account management module 743 to generate a user account for a subscriber at the life management platform; a receive interface 726 to communicably interface the life management platform with a user device 799 over a network, wherein the user device operates remotely from the life management platform; an authenticator 742 to authenticate the subscriber via subscriber credentials received from the user device; the receive interface 726 to further receive input from the user device defining each of: (i) one or more contacts, (ii) one or more messages, and (iii) one or more documents; the receive interface to further receive a request to configure a plan for the subscriber and configuring the plan to include (i) at least one of the one or more contacts, (ii) at least one of the one or more messages for the included contacts, and (iii) at least one of the one or more documents to be made accessible to the included contacts; a configurator 789 to define an event trigger for the plan, wherein the event trigger is to initiate execution of the plan upon occurrence of a subscriber defined event; and a plan executor 744 to trigger execution of the plan at the system pursuant to determination the event trigger has occurred, wherein execution of the plan includes transmitting a notice to the included contacts for the plan with a link to access the message and the one or more documents.

Configuration information and user interactions are stored within the database 750. Bus 716 interfaces the various components of the system 701 amongst each other, with any other peripheral(s) of the system 701, and with external components such as external network elements, other machines, client devices, cloud computing services, etc. Communications may further include communicating with external devices via a network interface over a LAN, WAN, or the public Internet.

According to a particular embodiment, there is non-transitory computer readable storage media having instructions stored thereupon that, when executed by a processor 790 and memory 795 of a system 701, the instructions cause the system to perform operations including: executing a hosted application via the system at a host organization, in which the hosted application includes a Graphical User Interface (GUI) to receive user interactions; transmitting the GUI to a user device remote from the host organization, in which the GUI is to be displayed to the user device and receive the user interactions as input at the displayed GUI of the user device; receiving, at the host organization, logged user data representing the user interactions with the hosted application received via the GUI displayed to the user device; analyzing the logged user data via the system of the host organization; and triggering a keyboard shortcut recommendation based on the analysis of the logged user data, in which the triggered keyboard shortcut recommendation is pushed from the host organization to the user device for display at the user device.

The scope of patented subject matter is defined only by the allowed claims. None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
   generating a user account for a subscriber at the system;
   communicably interfacing with a user device over a network via a receive interface of the system, wherein the user device operates remotely from the system;
   authenticating the subscriber via subscriber credentials received from the user device;
   receiving input from the user device defining each of: (i) one or more contacts, (ii) one or more messages, and (iii) one or more documents;
   receiving a request to configure a plan for the subscriber and configuring the plan to include (i) at least one of the one or more contacts, (ii) at least one of the one or more messages for the included contacts, and (iii) at least one of the one or more documents to be made accessible to the included contacts;
   defining an event trigger for the plan, wherein the event trigger is to initiate execution of the plan upon occurrence of a subscriber defined event;
   triggering execution of the plan at the system pursuant to determination the event trigger has occurred, wherein execution of the plan includes transmitting a notice to the included contacts for the plan with a link to access the message and the one or more documents;
   wherein the system implements a life management platform;
   wherein the life management platform executes via the processor and the memory of the system providing on-demand cloud based services to a plurality of subscribers; and
   wherein each of the subscribers communicate with the life management platform system via a computing device which is remote from the life management platform and communicably interfaced with the life management platform via a public Internet.

2. The method of claim 1:
   wherein the notice transmitted to the included contacts for the plan does not include either the message or the documents to be made accessible to the included contacts;
   wherein the link included with the notice instantiates a Secure Message Viewer (SMV) when followed; and
   wherein the message is viewable within the Secure Message Viewer and the documents are accessible for download via the Secure Message Viewer subsequent to successful authentication of one of the contacts via the Secure Message Viewer.

3. The method of claim 1, further comprising:
   receiving the link at the receive interface of the system from a second user device;
   instantiating a Secure Message Viewer (SMV) to execute at the second user device;
   prompting one of the included contacts for the plan to authenticate with the system via the Secure Message Viewer, wherein the included contact to authenticate is uniquely associated with the link received at the system;
   receiving authentication credentials via the Secure Message Viewer executing at the second user device successfully validating the included contact's identity; and
   displaying an event landing page to the second user device via the Secure Message Viewer, wherein the event landing page displays at least the message for the included contacts of the plan and one or more documents accessible for download.

4. The method of claim 3, wherein:
authentication via the Secure Message Viewer executing at the second user device fails pursuant to any one of:
receiving a malformed link at the system;
receiving an expired link at the system;
receiving the link at the system in an encrypted form and failing to decrypt the link at the system;
receiving authentication credentials which do not match an included user for the plan;
receiving authentication credentials which do not match an included user uniquely associated with the link received; and
wherein the method further comprises: re-prompting the second user device to authenticate with the system via the Secure Message Viewer until valid authentication credentials are received and denying access to the message and the documents until successful validation occurs.

5. The method of claim 1, further comprising:
receiving the link at the receive interface of the system from one of the included contacts for the plan;
wherein the included contact is not registered with the system and wherein the included contact lacks both a login id and a login password to authenticate with the system; and
authenticating the included contact with the system without creating the login id or the login password for the included contact.

6. The method of claim 5, wherein authenticating the included contact with the system comprises:
identifying which one of the one or more included contacts corresponds to the link received;
retrieving an email address and a cell phone number from the included contact, wherein the email address and the cell phone number are defined by the subscriber via the input defining the one or more contacts;
sending a two-factor authentication code to one or both of the email address and the cell phone number via SMS text format based on the included contact identified as corresponding to the link received;
prompting for the two-factor authentication code to be entered by the included contact; and
successfully authenticating the included contact when the two-factor authentication code entered by the included contact matches the two-factor authentication code sent.

7. The method of claim 5, wherein authenticating the included contact with the system comprises:
identifying which one of the one or more included contacts corresponds to the link received;
determining the included contact is connected with the subscriber via a social networking platform;
prompting the included contact to authenticate via the included contact's credentials for the social networking platform; and
successfully authenticating the included contact with the system when the included contact correctly authenticates with the social networking platform using a social network platform identity connected with the subscriber's social networking platform identity on the same social networking platform.

8. The method of claim 1, wherein receiving the request to configure the plan and configuring the plan to include the contacts, the messages, and the documents comprises:

displaying a configuration GUI to the subscriber via the user device communicably interfaced with the system; and
receiving subscriber configuration input via the configuration GUI to configure the plan, wherein the subscriber configuration input includes one or more of:
(i) subscriber configuration input assigning at least one contact to the plan and assigning at least one message to be displayed to the contact and assigning at least one document to be made accessible to the contact;
(ii) subscriber configuration input creating a message group for the plan and subscriber configuration input assigning multiple contacts to the message group for the plan and assigning a message to be displayed to the message group for the plan and assigning one or more documents to be made accessible to all of the multiple contacts of the message group; and
(iii) subscriber configuration input creating multiple message groups for the plan, wherein each of the multiple message groups include one or more of the contacts, wherein each of the multiple message groups include a message to be displayed to each respective message group, wherein each message to be displayed to the respective message groups is distinct, and wherein each of the multiple message groups further specifies one or more documents to be made accessible to the included one or more contacts of each respective message group.

9. The method of claim 1:
wherein the plan comprises an accident plan; and
wherein the event trigger defined for the plan to initiate execution of the plan comprises at least one of the following:
(i) receiving a manual start request for the accident plan from the subscriber's authenticated account;
(ii) receiving an incident initiation form from any of the one or more contacts included in the plan followed by an approval to validate the incident initiation form from the subscriber's authenticated account;
(iii) receiving the incident initiation form from one of the included contact's authenticated account having "executor" authority on behalf of the subscriber followed by an approval to validate the incident initiation form from the contact's authenticated account having "executor" authority; and
(iv) receiving the incident initiation form from any of the one or more contacts included in the plan followed by an approval to validate the incident initiation form from the contact's authenticated account having "executor" authority.

10. The method of claim 1:
wherein the plan comprises an accident plan;
wherein the plan includes a subscriber configured and subscriber activated optional time-out period; and
wherein triggering execution of the plan at the system pursuant to determination the event trigger has occurred comprises:
receiving an incident initiation form from any of the one or more contacts included in the plan;
monitoring for an approval of the incident initiation form from the subscriber's authenticated account or from one of the included contact's authenticated account having "executor" authority on behalf of the subscriber for the duration of the time-out period following submission of the incident initiation form; and
automatically triggering execution of the plan at the system without approval of the incident initiation form after the time-out period has elapsed.

11. The method of claim 1:
wherein the plan comprises a death plan; and
wherein the event trigger defined for the plan to initiate execution of the plan comprises at least one of the following:
(i) receiving an incident initiation form from any of the one or more contacts included in the plan followed by an affirmative denial invalidating the incident initiation form from the subscriber's authenticated account and preventing the triggering of the plan execution;
(ii) receiving an incident initiation form from one of the included contact's authenticated account having "executor" authority on behalf of the subscriber followed by an approval to validate the incident initiation form from the contact's authenticated account having "executor" authority; and
(iii) receiving the incident initiation form from any of the one or more contacts included in the plan followed by an approval to validate the incident initiation form from the contact's authenticated account having "executor" authority.

12. The method of claim 1:
wherein the plan comprises a generic plan; and
wherein the event trigger defined for the plan to initiate execution of the plan comprises at least one of the following:
(i) receiving a manual start request for the generic plan from the subscriber's authenticated account; and
(ii) receiving subscriber configuration input specifying a begin date and automatically beginning the generic plan on the date specified by the subscriber configuration input.

13. The method of claim 12, further comprising terminating execution of the generic plan pursuant at least one of the following:
(i) receiving a manual end request for the executing generic plan from the subscriber's authenticated account; and
(ii) receiving subscriber configuration input specifying an end date and automatically ending the generic plan on the date specified by the subscriber configuration input.

14. The method of claim 1:
wherein each of the one or more documents comprise at least one of:
a digital asset;
a digital document;
a digitized representation of a physical document;
a "Document Not Present" (DNP) type document specifying a DNP description and a DNP location for a physical document.

15. The method of claim 1:
wherein each of the plurality of subscribers own a user account within the life management platform; and
wherein each user account includes at least:
a plurality of contacts defined by the subscriber;
a plurality of messages defined by the subscriber; and
one or more life events defined as one or more corresponding plans configured by the subscriber, each plan including a subscriber configurable event trigger for the respective plan.

16. Non-transitory computer readable storage media having instructions stored thereupon that, when executed by a system having at least a processor and a memory therein, the instructions cause the system to perform instructions comprising:
generating a user account for a subscriber at the system;
communicably interfacing with a user device over a network via a receive interface of the system, wherein the user device operates remotely from the system;
authenticating the subscriber via subscriber credentials received from the user device;
receiving input from the user device defining each of: (i) one or more contacts, (ii) one or more messages, and (iii) one or more documents;
receiving a request to configure a plan for the subscriber and configuring the plan to include (i) at least one of the one or more contacts, (ii) at least one of the one or more messages for the included contacts, and (iii) at least one of the one or more documents to be made accessible to the included contacts;
defining an event trigger for the plan, wherein the event trigger is to initiate execution of the plan upon occurrence of a subscriber defined event;
triggering execution of the plan at the system pursuant to determination the event trigger has occurred, wherein execution of the plan includes transmitting a notice to the included contacts for the plan with a link to access the message and the one or more documents;
wherein the system implements a life management platform;
wherein the life management platform executes via the processor and the memory of the system providing on-demand cloud based services to a plurality of subscribers; and
wherein each of the subscribers communicate with the life management platform system via a computing device which is remote from the life management platform and communicably interfaced with the life management platform via a public Internet.

17. The non-transitory computer readable storage media of claim 16, wherein the instructions cause the system to perform operations further including:
receiving the link at the receive interface of the system from a second user device;
instantiating a Secure Message Viewer (SMV) to execute at the second user device;
prompting one of the included contacts for the plan to authenticate with the system via the Secure Message Viewer, wherein the included contact to authenticate is uniquely associated with the link received at the system;
receiving authentication credentials via the Secure Message Viewer executing at the second user device successfully validating the included contact's identity; and
displaying an event landing page to the second user device via the Secure Message Viewer, wherein the event landing page displays at least the message for the included contacts of the plan and one or more documents accessible for download.

18. The non-transitory computer readable storage media of claim 16:
wherein the notice transmitted to the included contacts for the plan does not include either the message or the documents to be made accessible to the included contacts;
wherein the link included with the notice instantiates a Secure Message Viewer (SMV) when followed; and
wherein the message is viewable within the Secure Message Viewer and the documents are accessible for download via the Secure Message Viewer subsequent to successful authentication of one of the contacts via the Secure Message Viewer.

19. A life management platform, comprising:

a memory to store instructions;

a processor to execute the instructions;

an account management module to generate a user account for a subscriber at the life management platform;

a receive interface to communicably interface the life management platform with a user device over a network, wherein the user device operates remotely from the life management platform;

an authenticator to authenticate the subscriber via subscriber credentials received from the user device;

the receive interface to further receive input from the user device defining each of: (i) one or more contacts, (ii) one or more messages, and (iii) one or more documents;

the receive interface to further receive a request to configure a plan for the subscriber and configuring the plan to include (i) at least one of the one or more contacts, (ii) at least one of the one or more messages for the included contacts, and (iii) at least one of the one or more documents to be made accessible to the included contacts;

a configurator to define an event trigger for the plan, wherein the event trigger is to initiate execution of the plan upon occurrence of a subscriber defined event;

a plan executor to trigger execution of the plan at the system pursuant to determination the event trigger has occurred, wherein execution of the plan includes transmitting a notice to the included contacts for the plan with a link to access the message and the one or more documents;

wherein the system implements a life management platform;

wherein the life management platform executes via the processor and the memory of the system providing on-demand cloud based services to a plurality of subscribers; and wherein each of the subscribers communicate with the life management platform system via a computing device which is remote from the life management platform and communicably interfaced with the life management platform via a public Internet.

20. The life management platform of claim 19, further comprising:

the receive interface to further receive the link at the receive interface of the system from a second user device;

the plan executor to instantiate a Secure Message Viewer (SMV) to execute at the second user device;

the plan executor to prompt one of the included contacts for the plan to authenticate with the system via the Secure Message Viewer, wherein the included contact to authenticate is uniquely associated with the link received at the system;

the receive interface to further receive authentication credentials via the Secure Message Viewer executing at the second user device successfully validating the included contact's identity; and the plan executor to display an event landing page to the second user device via the Secure Message Viewer, wherein the event landing page displays at least the message for the included contacts of the plan and one or more documents accessible for download.

* * * * *